United States Patent
Imaizumi et al.

(10) Patent No.: US 10,982,167 B2
(45) Date of Patent: Apr. 20, 2021

(54) VISCOSITY INDEX IMPROVER AND LUBRICATING OIL COMPOSITION

(71) Applicant: NIPPON SHOKUBAI CO., LTD., Osaka (JP)

(72) Inventors: Yohei Imaizumi, Osaka (JP); Keiko Izumi, Osaka (JP); Kazunari Yasumura, Osaka (JP); Daisuke Matsui, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 16/332,027

(22) PCT Filed: Sep. 20, 2017

(86) PCT No.: PCT/JP2017/033934
§ 371 (c)(1),
(2) Date: Mar. 11, 2019

(87) PCT Pub. No.: WO2018/056316
PCT Pub. Date: Mar. 29, 2018

(65) Prior Publication Data
US 2019/0211281 A1    Jul. 11, 2019

(30) Foreign Application Priority Data

Sep. 21, 2016  (JP) .............................. JP2016-184783
Mar. 27, 2017  (JP) .............................. JP2017-060691

(51) Int. Cl.
| | | |
|---|---|---|
| C10L 1/22 | (2006.01) | |
| C10M 149/10 | (2006.01) | |
| C08F 220/18 | (2006.01) | |
| C10M 169/04 | (2006.01) | |
| C10M 149/06 | (2006.01) | |
| C08F 290/04 | (2006.01) | |
| C10N 20/02 | (2006.01) | |
| C10N 20/04 | (2006.01) | |
| C10N 30/02 | (2006.01) | |
| C10N 30/00 | (2006.01) | |
| C10N 40/08 | (2006.01) | |
| C10N 40/25 | (2006.01) | |

(52) U.S. Cl.
CPC ......... *C10M 149/10* (2013.01); *C08F 220/18* (2013.01); *C08F 290/04* (2013.01); *C08F 290/048* (2013.01); *C10M 149/06* (2013.01); *C10M 169/041* (2013.01); *C08F 220/1804* (2020.02); *C08F 2800/20* (2013.01); *C10M 2203/003* (2013.01); *C10M 2203/1025* (2013.01); *C10M 2209/084* (2013.01); *C10M 2217/024* (2013.01); *C10M 2217/028* (2013.01); *C10N 2020/02* (2013.01); *C10N 2020/04* (2013.01); *C10N 2030/02* (2013.01); *C10N 2030/68* (2020.05); *C10N 2040/08* (2013.01); *C10N 2040/25* (2013.01)

(58) Field of Classification Search
CPC .............. C10M 149/10; C10M 149/06; C10M 169/041; C10M 2217/024; C10M 2209/084; C10M 2203/1025; C10M 2217/028; C08F 290/048; C08F 290/04; C08F 220/18; C08F 220/1804; C08F 2800/20; C10N 2020/02; C10N 2020/04; C10N 2040/08; C10N 2040/25
USPC ....................................................... 508/297
See application file for complete search history.

(56) References Cited

U.S. PATENT DOCUMENTS

| | | | |
|---|---|---|---|
| 4,160,739 A | 7/1979 | Stambaugh et al. | |
| 5,565,130 A | 10/1996 | Omeis et al. | |
| 6,979,716 B1 | 12/2005 | Nakagawa et al. | |
| 2006/0052563 A1 | 3/2006 | Nakagawa et al. | |
| 2010/0167970 A1 | 7/2010 | Stoehr et al. | |
| 2010/0190671 A1 | 7/2010 | Stoehr et al. | |
| 2011/0319305 A1 | 12/2011 | Eisenberg et al. | |
| 2012/0053100 A1 | 3/2012 | Radano et al. | |
| 2012/0258899 A1 | 10/2012 | Eisenberg et al. | |
| 2012/0302476 A1* | 11/2012 | Koschabek ........... C08F 220/18 508/469 |

(Continued)

FOREIGN PATENT DOCUMENTS

| | | |
|---|---|---|
| JP | 54-95604 | 7/1979 |
| JP | 6-306130 | 11/1994 |

(Continued)

OTHER PUBLICATIONS

International Search Report dated Oct. 17, 2017 in International (PCT) Application No. PCT/JP2017/033934.

(Continued)

*Primary Examiner* — Prem C Singh
*Assistant Examiner* — Francis C Campanell
(74) *Attorney, Agent, or Firm* — Wenderoth, Lind & Ponack, L.L.P.

(57) ABSTRACT

A viscosity index improver comprising a copolymer having a unit (a) derived from a maleimide monomer and a unit (b) derived from a macromonomer, wherein viscosity measured by the following method is 8000 mPa·s or less. Viscosity measurement method: A solution composed of 78 mass % of a Group III base oil (viscosity index: 122, kinematic viscosity at 40° C.: 19.6 mm$^2$/s) on the American Petroleum Institute (API) classification and 22 mass % of the copolymer is measured with a viscometer (TVB-10 manufactured by Toki Sangyo Co., Ltd., rotor: SPINDLE No. M3, rotation speed: 6 rpm) at 25° C.

11 Claims, No Drawings

(56) References Cited

U.S. PATENT DOCUMENTS

| | | |
|---|---|---|
| 2014/0135243 A1 | 5/2014 | Takagi et al. |
| 2014/0315771 A1 | 10/2014 | Iwai |
| 2015/0175926 A1 | 6/2015 | Matsui et al. |
| 2015/0184109 A1 | 7/2015 | Matsui et al. |
| 2015/0197705 A1 | 7/2015 | Matsui et al. |
| 2015/0203781 A1 | 7/2015 | Matsui et al. |
| 2015/0203782 A1 | 7/2015 | Matsui et al. |
| 2015/0203785 A1 | 7/2015 | Matsui et al. |
| 2015/0322370 A1 | 11/2015 | Matsui et al. |
| 2017/0233675 A1 | 8/2017 | Ugamura et al. |
| 2019/0203148 A1 | 7/2019 | Schöller et al. |
| 2020/0216596 A1 | 7/2020 | Schöller et al. |
| 2020/0224116 A1 | 7/2020 | Schöller et al. |

FOREIGN PATENT DOCUMENTS

| | | |
|---|---|---|
| JP | 8-176576 | 7/1996 |
| JP | 9-40986 | 2/1997 |
| JP | 2007-254758 | 10/2007 |
| JP | 2009-7562 | 1/2009 |
| JP | 2009-506179 | 2/2009 |
| JP | 2010-532805 | 10/2010 |
| JP | 2012-520358 | 9/2012 |
| JP | 2012-197399 | 10/2012 |
| JP | 2012-529550 | 11/2012 |
| JP | 2013-104032 | 5/2013 |
| JP | 2013-227438 | 11/2013 |
| JP | 2014-224246 | 12/2014 |
| JP | 2015-86314 | 5/2015 |
| JP | 2016-56362 | 4/2016 |
| JP | 2016-69446 | 5/2016 |
| JP | 2019-532134 | 11/2019 |
| JP | 2020-526649 | 8/2020 |
| WO | 2014/017556 | 1/2014 |
| WO | 2016/043195 | 3/2016 |

OTHER PUBLICATIONS

Nakata, "Viscosity index improver for high performance engine oil", Sanyo Chemical news, Sanyo Chemical Industries Ltd., 2013, No. 476, pp. 1-4, with partial English translation.

Notice of Submission of Information by Third Parties dated Jul. 14, 2020 in corresponding Japanese Patent Application No. 2017-180407, with partial English translation.

Notice of Submission of Information by Third Parties dated Sep. 29, 2020 in corresponding Japanese Patent Application No. 2017-180407, with English machine translation.

Office Action dated Jan. 26, 2021 in corresponding Japanese Application No. 2017-180407, with English machine.

Office Action dated Jan. 26, 2021 in corresponding Japanese Application No. 2017-180408, with English machine.

* cited by examiner

VISCOSITY INDEX IMPROVER AND LUBRICATING OIL COMPOSITION

TECHNICAL FIELD

The present invention relates to a viscosity index improver and a lubricating oil composition containing the same.

BACKGROUND ART

In recent years, lubricating oils for internal combustion engines are strongly required to improve fuel economy characteristics, and as one means, reduction of friction loss due to lowering viscosity of a lubricating oil is cited. However, merely lowering the viscosity causes problems such as leakage and burning, so it is effective to add a viscosity index improver having the effect of keeping the viscosity low at low temperature while ensuring high viscosity at high temperature.

As the viscosity index improver, a viscosity index improver containing a polymer is known, and there are various kinds of them. Among them, a viscosity index improver comprising an alkyl (meth)acrylate polymer shows a high viscosity index improving effect. Meanwhile, the viscosity index improver comprising an alkyl (meth)acrylate polymer has a problem that shear stability is poor so that fuel saving characteristics are deteriorated for a long-term use (that is a poor long-life property).

As a means for improving the shear stability, for example, decrease of molecular weight of the polymer contained in the viscosity index improver is cited. In general, the lower the molecular weight, the less susceptible to shear and the smaller the degree of the molecular weight decreasing; and therefore, it is possible to suppress the viscosity lowering after shearing by using a low molecular weight viscosity index improver (refer to Patent Literature 1 and Non-Patent Literature 1). In addition, it has been reported that attempts have been made to improve the shear stability with a polymer having a star structure of which divinylbenzene is used as a core part (refer to Patent Literature 2) and a polymer having a comb structure is used as a component of a lubricating oil composition (refer to Patent Literatures 3 and 4).

CITATION LIST

Patent Literature

Patent Literature 1

Japanese Unexamined Patent Application Publication No. 2013-104032

Patent Literature 2

Japanese Unexamined Patent Application Publication No. 2012-197399

Patent Literature 3

Japanese Unexamined Patent Application Publication No. 2010-532805

Patent Literature 4

Japanese Unexamined Patent Application Publication No. 2012-520358

Non-Patent Literature

Non-Patent Literature 1

Nakata, "Viscosity index improver for high performance engine oil", Sanyo Chemical News, Sanyo Chemical Industries Ltd., 2013, No. 476

SUMMARY OF INVENTION

Technical Problem

However, in general, the lower the molecular weight, the lower the viscosity index improving effect tends to be; and therefore, when a low molecular weight viscosity index improver is used, the problem of lowering the viscosity index occurs. Furthermore, in order to adjust the viscosity to a desired degree, it is necessary to increase the amount of the viscosity index improver to be used, that tends to be disadvantageous in cost. A lubricating oil composition contains a lubricating base oil, various additives, a viscosity index improver and others, and the viscosity index improver is generally dissolved in a base oil to be handled as a base oil composition. In the case that the viscosity index improver concentration in the base oil composition is high, not only the degree of freedom of blending in the lubricating oil composition increases but also the amount of the lubricating base oil used per unit mass in the viscosity index improver decreases, and so it advantageous in cost of production and transportation, however, the viscosity of the base oil composition may increase so that handling property at around room temperature is deteriorated, or heating or some special equipment may be required in mixing with other components so that the productivity is decreased in some cases.

The present invention has been achieved in view of the above circumstances, and an object of the present invention is to provide a viscosity index improver which has high viscosity index and good shear stability and of which the base oil solution has high fluidity at around room temperature and is excellent in handleability, and a lubricating oil composition containing the viscosity index improver.

Solution to Problem

The present invention includes the following inventions.

[1] A viscosity index improver comprising a copolymer having a unit (a) derived from a maleimide monomer and a unit (b) derived from a macromonomer, wherein viscosity measured by the following method is 8000 mPa·s or less.

(Viscosity measurement method) A solution composed of 78 mass % of a Group III base oil (viscosity index: 122, kinematic viscosity at 40° C.: 19.6 mm$^2$/s) on the American Petroleum Institute (API) classification and 22 mass % of the copolymer is measured with a viscometer (TVB-10 manufactured by Toki Sangyo Co., Ltd., rotor: SPINDLE No. M3, rotation speed: 6 rpm) at 25° C.

[2] The viscosity index improver according to [1], wherein a content of the unit (a) is 1 part by mass or more and 20 parts by mass or less in 100 parts by mass of the copolymer.

[3] The viscosity index improver according to [1] or [2], wherein a content of the macromonomer is 18 parts by mass or less, relative to 100 parts by mass of a total of the unit (b) and the macromonomer.

[4] The viscosity index improver according to any one of [1] to [3], wherein weight-average molecular weight (Mw) of the copolymer is 200,000 to 700,000, and number-average molecular weight (Mn) of the copolymer is 120,000 to 500,000.

[5] The viscosity index improver according to any one of [1] to [4], wherein the copolymer further has a unit (c)

derived from an alkyl (meth)acrylate having an alkyl group of 1 to 6 carbon atoms, and a content of the unit (b) is 6 parts by mass or more and less than 20 parts by mass, a content of the unit (c) is 40 parts by mass or more and less than 74 parts by mass, and a total content of the unit (b) and the unit (c) is 46 parts by mass or more and less than 80 parts by mass in 100 parts by mass of the copolymer.

[6] The viscosity index improver according to any one of [1] to [5], wherein the copolymer further has a unit (d) derived from an alkyl (meth)acrylate having an alkyl group of 11 to 40 carbon atoms, and a content of the unit (d) is 3 parts by mass or more and 40 parts by mass or less in 100 parts by mass of the copolymer.

[7] The viscosity index improver according to any one of [1] to [6], wherein the unit (b) has an urethane bond.

[8] The viscosity index improver according to any one of [1] to [7], wherein the unit (b) has a repeating structure of a branched chain alkylene group.

[9] The viscosity index improver according to any one of [1] to [8], wherein an intrinsic viscosity $[\eta]_{100}$ of the copolymer in a Group III base oil (viscosity index: 122, kinematic viscosity at 40° C.: 19.6 mm²/s) on the American Petroleum Institute (API) classification at 100° C. is 0.07 dL/g or more and 0.17 dL/g or less, and an intrinsic viscosity $[\eta]_{40}$ of that at 40° C. is 0.01 dL/g or more and 0.08 dL/g or less.

[10] A lubricating oil composition comprising a lubricating base oil and the viscosity index improver according to any one of [1] to [9].

Advantageous Effects of Invention

By using the viscosity index improver of the present invention, a base oil solution thereof comes to exhibit a high viscosity index and a good shear stability. In addition, a base oil solution of the viscosity index improver of the present invention has high fluidity at around room temperature and is easily handled, so that workability and productivity in preparing a lubricating oil composition are improved.

DESCRIPTION OF EMBODIMENTS

[1. Viscosity Index Improver]

A viscosity index improver of the present invention comprises a copolymer having a unit (a) derived from a maleimide monomer and a unit (b) derived from a macromonomer. Since the viscosity index improver of the present invention comprises a copolymer having the unit (a) and the unit (b), solubility in a base oil is enhanced, a base oil solution thereof exhibits a high viscosity index and shear stability can be also improved. Therefore, by using the viscosity index improver of the present invention, it is possible to improve both a viscosity index and shear stability, which are in conflicting relationship with respect to molecular weight of the polymer. In addition, the viscosity index improver of the present invention has high fluidity when it is prepared as a base oil solution and is excellent in handleability.

The copolymer used in the viscosity index improver of the present invention can be obtained by copolymerizing a maleimide monomer and a macromonomer, and copolymerizing a macromonomer with a maleimide monomer makes it possible to suppress residual amounts of unreacted monomers, in particular, a macromonomer, of which polymerization ratio tends to decrease significantly during copolymerization, thereby increasing the polymerization ratio. In general, a macromonomer has a low copolymerizability relative to other monomers and the polymerization ratio thereof tends to be low. In this case, since the unit derived from a macromonomer is not efficiently introduced into the copolymer, a deviation arises between the composition of raw materials in copolymerization (that is, a design composition of the copolymer) and the composition of the copolymer actually obtained, and deterioration of viscosity characteristics, durability and base oil solubility of the copolymer and the viscosity index improver containing the copolymer are easily caused. Meanwhile, there is possibility that such deterioration of the properties may be reduced by using a macromonomer in excess of the design composition, but the amount of unreacted macromonomer remaining in the system increases and there is a concern that viscosity characteristics will change due to that. In addition, since macromonomers are relatively more expensive than other monomers, costs of the copolymer and the viscosity index improver containing the copolymer are raised, that is undesirable. However, by copolymerizing a macromonomer with a maleimide monomer, the unit derived from the macromonomer can be efficiently introduced into the copolymer, and so, the copolymer is easily produced and control of the composition of monomer components in the copolymer is also facilitated. In the case that the reaction solution obtained by the polymerization reaction is used as a viscosity index improver, it is possible to suppress viscosity characteristics of the viscosity index improver from greatly changing due to the influence of the unreacted monomer components (in particular, the macromonomer).

The copolymer contained in the viscosity index improver has a succinimide ring structure in the main chain of the copolymer as the unit (a) derived from a maleimide monomer. By introducing the ring structure into the main chain of the copolymer, shear stability and heat resistance of the viscosity index improver can be enhanced while ensuring solubility of the viscosity index improver in a base oil. Furthermore, when it is made into a lubricating oil composition, effects such as improvement of detergency and dispersibility of sludge and the like and suppression of abrasion of a metal surface are expected. The unit (a) can be introduced into the copolymer by copolymerizing a maleimide which may have a substituent at the N-position with a monomer component such as a macromonomer.

The unit (a) is preferably a unit represented by the following formula (1). In the formula (1), $R^1$ and $R^2$ each independently represent a hydrogen atom or an alkyl group, and $R^3$ represents a hydrogen atom or an organic group having 1 to 40 carbon atoms.

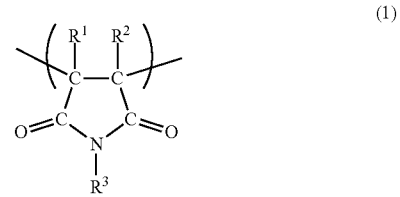

The alkyl group of $R^1$ and $R^2$ in the formula (1) preferably has 1 to 8 carbon atoms, more preferably 1 to 4 carbon atoms, and even more preferably 1 to 3 carbon atoms. As $R^1$ and $R^2$, a hydrogen atom, methyl or ethyl is more preferable, and a hydrogen atom or methyl is even more preferable.

Examples of the organic group of $R^3$ in the formula (1) include an alkyl group, an aryl group, an aralkyl group, a group in which a part of —$CH_2$— contained in an alkyl group is replaced by —O—, and others, and these group may have a substituent such as hydroxyl, a halogen group, nitro, an alkyl group (in the case of an aryl group or an aralkyl group), an alkoxy group and carboxyl. In view of increasing solubility of the viscosity index improver in a base oil, the organic group of $R^3$ preferably has 1 to 24 carbon atoms, more preferably 1 to 18 carbon atoms, and even more preferably 1 to 12 carbon atoms.

Examples of the alkyl group of $R^3$ include linear or branched alkyl groups such as methyl, ethyl, n-propyl, isopropyl, n-butyl, isobutyl, t-butyl, n-pentyl, isopentyl, n-hexyl, isohexyl, n-heptyl, isoheptyl, n-octyl and 2-ethylhexyl, cyclic alkyl groups such as cyclopropyl, cyclobutyl, cyclopentyl, cyclohexyl, cyclononyl, cyclodecyl, dicyclopentanyl and adamantyl. Examples of the aryl group of $R^3$ include phenyl, tolyl, xylyl, naphthyl, biphenyl and others. Examples of the aralkyl group of $R^3$ include benzyl, naphthylmethyl and others. Examples of the group in which a part of —$CH_2$— contained in the alkyl group of $R^3$ is replaced by —O— include polyoxyalkylene groups such as polyoxyethylene group and polyoxypropylene group. From the viewpoint of ease of improving shear stability of the viscosity index improver, $R^3$ is preferably an aryl group, and from the viewpoint of ease of improving viscosity index thereof, $R^3$ is preferably a cycloalkyl group.

Specific examples of the maleimide monomer that gives the unit (a) derived from a maleimide monomer include, for example, maleimide, N-methylmaleimide, N-isopropylmaleimide, N-butylmaleimide, N-isobutylmaleimide, N-t-butylmaleimide, N-cyclohexylmaleimide, N-octylmaleimide, N-2-ethylhexylmaleimide, N-decylmaleimide, N-laurylmaleimide, N-tetradecylmaleimide, N-stearylmaleimide, N-2-decyltetradecylmaleimide, N-phenylmaleimide, N-benzylmaleimide, N-chlorophenylmaleimide, N-methylphenylmaleimide, N-naphthylmaleimide, N-hydroxyethylmaleimide, N-hydroxyphenylmaleimide, N-methoxyphenylmaleimid, N-carboxyphenylmaleimide, N-nitrophenylmaleimide, N-tribromophenylmaleimide and others. Among these maleimides, N-phenylmaleimide, N-cyclohexylmaleimide, N-isopropylmaleimide, N-benzylmaleimide, N-laurylmaleimide and N-stearylmaleimide are preferable as the maleimide monomer, from the viewpoint of easy availability of maleimide monomers and ease of enhancing solubility of the viscosity index improver in a base oil. Among them, as the maleimide monomer, N-phenylmaleimide is preferable from the viewpoint of enhancing shear stability of the viscosity index improver, and N-cyclohexylmaleimide is preferable from the viewpoint of improving viscosity index thereof.

The copolymer may have only one kind of the unit (a) derived from a maleimide monomer, or may have two or more kinds thereof.

The content of the unit (a) in the copolymer is preferably 1 part by mass or more, more preferably 2 parts by mass or more, even more preferably 3 parts by mass or more, and preferably 20 parts by mass or less, more preferably 15 parts by mass or less, even more preferably 10 parts by mass or less in 100 parts by mass of the copolymer. In the copolymer, the unit (b) derived from a macromonomer is contained, and when the unit (a) is contained in such a content in the copolymer, a polymerization ratio of the macromonomer that gives the unit (b) is improved in copolymerization of the monomer components to produce the copolymer and the residual amount of the macromonomer can be suppressed. In addition, solubility of the copolymer in a base oil is enhanced, a base oil solution thereof exhibits a high viscosity index, shear stability is improved, and high fluidity and excellent handleability are given.

The unit (b) derived from a macromonomer is a structural unit that can be introduced into the copolymer by copolymerizing a macromonomer. As the macromonomer, any macromolecule having a polymerizable functional group can be used without a particular limitation, and a macromonomer having a repeating structure derived from a hydrocarbon monomer is preferably used, in view of enhancing solubility of the copolymer in a base oil. Examples of the hydrocarbon monomer include monoolefins such as ethylene, propylene, 1-butene, isobutene, 1-tetradecene and 1-octadecene; alkadienes such as 1,3-butadiene, 2-methyl-1,3-butadiene, 1,3-pentadiene, 1,4-pentadiene, 1,5-hexadiene and 2,5-dimethyl-1,5-hexadiene (diisobutene); styrene monomers such as styrene, α-methylstyrene and vinyltoluene; and others. It is preferable that the alkadiene is polymerized in a state of having one more ethylenic carbon-carbon double bond at the end of the polymerization reaction and this unreacted ethylenic carbon-carbon double bond is hydrogenated after polymerization. As the hydrocarbon monomer, monoolefins, alkadienes and the like are preferable, and the carbon numbers of these monoolefins and alkadienes are preferably about 2 to 20, more preferably about 2 to 10, and even more preferably about 3 to 6.

As the unit (b) derived from the macromonomer, a unit represented by the following formula (2) is preferable from the viewpoint of ease of production and availability of the macromonomer. In the following formula (2), $R^4$ represents a hydrogen atom or an alkyl group having 1 to 4 carbon atoms, $X^1$ represents a single bond, an alkylene group, —O—, —CO—, —NH— or a linking group formed by combining these, and $R^5$ represents a polymer structure part of the macromonomer.

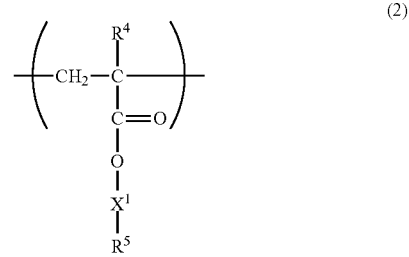

Examples of the alkyl group having 1 to 4 carbon atoms of $R^4$ in the formula (2) include methyl, ethyl, propyl, isopropyl, n-butyl, isobutyl, t-butyl and others. The alkyl group of $R^4$ preferably has 1 to 3 carbon atoms, more preferably 1 to 2 carbon atoms. Among them, $R^4$ is preferably a hydrogen atom or methyl.

In the case where $X^1$ in formula (2) is a single bond, the polymer structure part of $R^5$ directly bonds to the ester group in formula (2), and in the case where $X^1$ of formula (2) is a linking group such as an alkylene group, $R^5$ bonds to the ester group in formula (2) via the linking group. In the case where the linking group of $X^1$ contains an alkylene group, the alkylene group is preferably linear or branched, and the number of carbon atoms thereof is preferably 1 to 6, more preferably 1 to 4, and even more preferably 1 to 3. The linking group of $X^1$ also includes an ester bond (—CO—O—), an amide bond (—CO—NH—), an urethane bond (—NH—CO—O—) and the like other than those containing an alkylene group, and $X^1$ preferably contains one or more kinds selected from these bonds from the viewpoint that viscosity of a base oil solution of the viscosity index improver at room temperature lowers and handleability is improved, and particularly preferably contains an urethane bond.

The polymer structure part of $R^5$ in the formula (2) preferably contains a repeating structure derived from a hydrocarbon monomer, and examples of the hydrocarbon monomer include those exemplified above. The polymer structure part is preferably a hydrocarbon group, specifically preferably a polymer of monoolefin and/or alkadiene, and in the case where an unsaturated bond remains after polymerization, the unsaturated bond is preferably hydrogenated. Since such preferred polymer structure part is formed from carbon atoms and hydrogen atoms as a whole, it is referred to herein as a macrohydrocarbon group. Likewise, in the case where it does not contain an unsaturated bond, it is referred to as a macroalkyl group.

The macrohydrocarbon group or the macroalkyl group may be linear or branched, and is preferably branched from the viewpoint of suppressing crystallization at low temperature and preventing thickening in using as the viscosity index improver. The branched macrohydrocarbon group or macroalkyl group preferably contains a branched alkylene group as a repeating unit, and more preferably contains both a branched alkylene group and a linear alkylene group as a repeating unit. Examples of the branched alkylene group include 1,2-propylene, 1,2-butylene, 1,3-butylene, 2,3-butylene, 1,2-hexylene and others. Examples of the linear alkylene group include ethylene, 1,3-propylene, 1,4-butylene, 1,5-pentylene, 1,6-hexylene and others.

The copolymer may have only one kind of the unit (b) derived from a macromonomer, or may have two or more kinds thereof.

The number-average molecular weight of the unit (b) derived from a macromonomer is preferably 500 or more, more preferably 1,000 or more, even more preferably 1500 or more, still even more preferably 2,000 or more, and preferably 50,000 or less, more preferably 20,000 or less, even more preferably 10,000 or less, in view of solubility in a base oil, viscosity index and shear stability. In the unit represented by the above formula (2), the number of carbon atoms in the hydrocarbon group of $R^5$ is preferably 35 or more, more preferably 50 or more, even more preferably 70 or more, still even more preferably 100 or more, and preferably 3,500 or less, more preferably 1,500 or less, even more preferably 700 or less.

The content of the unit (b) in the copolymer is preferably 6 parts by mass or more, more preferably 7 parts by mass or more, even more preferably 8 parts by mass or more, and preferably less than 20 parts by mass, more preferably 18 parts by mass or less, even more preferably 16 parts by mass or less in 100 parts by mass of the copolymer. When the unit (b) is contained in such a content in the copolymer, solubility of the viscosity index improver in a base oil can be increased and shear stability can also be enhanced.

For the viscosity index improver, the content of a macromonomer, relative to 100 parts by mass of a total of the unit (b) and the macromonomer, is preferably 18 parts by mass or less, more preferably 16 parts by mass or less. That is, it is preferable that a large amount of the macromonomer giving the unit (b) is not remained in the viscosity index improver. The viscosity index improver of the present invention can be produced, for example, by blending a reaction solution of the polymerization reaction with a base oil and other additives, and by copolymerizing the maleimide monomer and the macromonomer in the polymerization reaction, the residual amount of unreacted macromonomer can be suppressed. Therefore, for thus obtained viscosity index improver, it is suppressed that the viscosity property of the viscosity index improver greatly changes due to a large amount of the unreacted macromonomer remaining, and the viscosity index improver is excellent in base oil solubility, a viscosity index, shear stability, and handleability when it is formed into a base oil solution. The total amount of the unit (b) and the macromonomer is equal to the total amount of the macromonomer placed in the polymerization system and the macromonomer fed into the polymerization system, and the content of the macromonomer is determined by the method described in the examples.

The copolymer contained in the viscosity index improver may have a unit (c) derived from an alkyl (meth)acrylate of which the alkyl group has 1 to 6 carbon atoms. The unit (c) can be introduced into the copolymer by copolymerizing an alkyl (meth)acrylate having an alkyl group of 1 to 6 carbon atoms with the macromonomer and others described above.

The unit (c) is preferably a unit represented by the following formula (3). In the formula (3), $R^b$ represents a hydrogen atom or methyl, and $R^7$ represents an alkyl group of 1 to 6 carbon atoms.

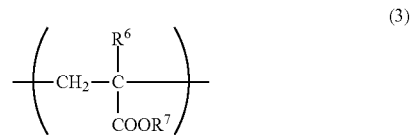

(3)

Examples of the alkyl group of 1 to 6 carbon atoms of $R^7$ in the formula (3) include linear or branched alkyl groups such as methyl, ethyl, propyl, isopropyl, n-butyl, isobutyl, t-butyl, pentyl and hexyl and cyclic alkyl groups such as cyclopropyl, cyclobutyl, cyclopentyl and cyclohexyl. The alkyl group of $R^7$ is preferably linear or cyclic, and more preferably linear. The number of carbon atoms in the alkyl group of $R^7$ is preferably 2 or more, and preferably 5 or less, more preferably 4 or less in the linear or branched alkyl group, and is preferably 5 or more in the cyclic alkyl group. Among them, in view of availability of the alkyl (meth) acrylate giving the unit (c) and excellent fluidity at around room temperature of the viscosity index improver, the alkyl group of $R^7$ is preferably butyl or cyclohexyl, and more preferably n-butyl or isobutyl.

The copolymer may have only one kind of the unit (c) derived from the alkyl (meth)acrylate having an alkyl group of 1 to 6 carbon atoms, or may have two or more kinds thereof.

The content of the unit (c) in the copolymer may be 0 parts by mass or more in 100 parts by mass of the copolymer. In the case where the unit (c) is contained in the copolymer, the content thereof is preferably 40 parts by mass or more, more preferably parts by mass or more, even more preferably 50 parts by mass or more, still even more preferably 55 parts by mass or more. When the unit (c) is contained in such a content, a viscosity index of the base oil solution of the viscosity index improver is enhanced and shear stability of the viscosity index improver is improved. Meanwhile, the content of the unit (c) in the copolymer is preferably less than 74 parts by mass, more preferably 72 parts by mass or less, even more preferably 70 parts by mass or less, still even more preferably 68 parts by mass or less in the 100 parts by mass of the copolymer. When the unit (c) is contained in such a content, solubility of the viscosity index improver in a base oil can be increased.

In view of increasing a viscosity index of the base oil solution of the viscosity index improver and enhancing shear stability of the viscosity index improver, the total content of the unit (b) and the unit (c) in the copolymer is preferably 46 parts by mass or more, more preferably 50 parts by mass or more, even more preferably 53 parts by mass or more, still even more preferably 56 parts by mass or more, particularly preferably 60 parts by mass or more in 100 parts by mass of the copolymer. In addition, in view of increasing solubility of the viscosity index improver in a base oil, the total content of the unit (b) and the unit (c) is preferably less than 80 parts by mass, more preferably 79 parts by mass or less in 100 parts by mass of the copolymer.

The above-described content of the unit (c) in the copolymer or the total content of the unit (b) and the unit (c) may be defined for the $R^7$ of which the alkyl group has 2 or more carbon atoms. In this case, as compared with the case where a unit derived from methyl (meth)acrylate is introduced into the copolymer instead of the unit (c), viscosity of the base oil solution of the viscosity index improver at around room temperature lowers and handleability can be improved.

The copolymer contained in the viscosity index improver may have a unit (d) derived from an alkyl (meth)acrylate of which the alkyl group has 11 to 40 carbon atoms. When the unit (d) is contained in the copolymer, solubility of the viscosity index improver in a base oil tends to increase. The unit (d) can be introduced into the copolymer by copolymerizing an alkyl (meth)acrylate having an alkyl group of 11 to 40 carbon atoms with the macromonomer and others described above.

The unit (d) is preferably a unit represented by the following formula (4). In the formula (4), $R^8$ represents a hydrogen atom or methyl, and $R^9$ represents an alkyl group of 11 to 40 carbon atoms.

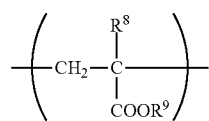

(4)

Examples of the alkyl group of 11 to 40 carbon atoms of $R^9$ in the formula (4) include linear or branched alkyl groups such as undecyl, dodecyl, tridecyl, tetradecyl, pentadecyl, hexadecyl, heptadecyl, octadecyl, nonadecyl, icosyl, tetracosyl and 2-decyltetradecyl and cyclic alkyl groups such as cycloheptyl, cyclooctyl, cyclononyl, cyclodecyl, dicyclopentanyl and adamantyl. The alkyl group of $R^9$ is preferably linear or branched, and more preferably linear. The number of carbon atoms therein is preferably 12 or more, more preferably 14 or more, and preferably 35 or less, more preferably 30 or less.

The copolymer may have only one kind of the unit (d) derived from the alkyl (meth)acrylate having an alkyl group of 11 to 40 carbon atoms, or may have two or more kinds thereof.

The content of the unit (d) in the copolymer may be 0 parts by mass or more in 100 parts by mass of the copolymer. In the case where the unit (d) is contained in the copolymer, the content thereof is preferably 3 parts by mass or more, more preferably 6 parts by mass or more, even more preferably 10 parts by mass or more, and preferably parts by mass or less, more preferably 35 parts by mass or less, even more preferably parts by mass or less in 100 parts by mass of the copolymer. When the unit (d) is contained in the copolymer in such a content, solubility of the viscosity index improver in a base oil is easily increased.

The total content of the unit (a), the unit (b), the unit (c) and the unit (d) in the copolymer is preferably 49 parts by mass or more, more preferably 50 parts by mass or more, even more preferably 60 parts by mass or more, still even more preferably 70 parts by mass or more, particularly preferably 80 parts by mass or more in 100 parts by mass of the copolymer. The upper limit of the total content of the unit (a), the unit (b), the unit (c) and the unit (d) in the copolymer is not particularly limited, and the copolymer may substantially consist of the unit (a), the unit (b), the unit (c) and the unit (d), or the total content of the unit (a), the unit (b), the unit (c) and the unit (d) in the copolymer may be 98 parts by mass or less, or 95 parts by mass or less in 100 parts by mass of the copolymer.

The copolymer contained in the viscosity index improver may have a unit derived from a monomer other than the units (a) to (d) described above (that is hereinafter referred to as a "unit (e)"). Since the units (a) to (d) can be introduced into the copolymer as its constituent by radical copolymerizing the corresponding maleimide monomer, macromonomer and alkyl (meth)acrylate, the unit (e) is also preferably a unit derived from a radical polymerizable monomer. The radical polymerizable monomer giving the unit (e) can be classified into a monofunctional monomer having one radically polymerizable group in the molecule and a multifunctional monomer having two or more radically polymerizable groups in the molecule.

Examples of the monofunctional monomer include (meth)acrylates other than the alkyl (meth)acrylates giving the unit (c) and the unit (d), unsaturated mono- or dicarboxylate esters, unsaturated carboxylic acids, vinylaromatic compounds, vinyl esters, vinyl ethers, olefins, vinyl cyanides, N-vinyl compounds and others. The unit (e) formed from these monofunctional monomers may be only one kind or two or more kinds.

Examples of the (meth)acrylate other than the alkyl (meth)acrylates giving the unit (c) and the unit (d) include, for example, benzyl (meth)acrylate, phenyl (meth)acrylate, 2-hydroxyethyl (meth)acrylate, 2-hydroxybutyl (meth)acrylate, 2-methoxyethyl (meth)acrylate, tetrahydrofurfuryl (meth)acrylate, N,N-dimethylaminoethyl (meth)acrylate, morpholinoalkylene (meth)acrylate, methyl α-hydroxymethylacrylate, polyethyleneglycol mono(meth)acrylate and others.

Examples of the unsaturated mono- or dicarboxylate ester include, for example, butyl crotonate, octyl crotonate, dibutyl maleate, dilauryl maleate, dioctyl fumarate, distearyl fumarate and others.

Examples of the unsaturated carboxylic acid include, for example, (meth)acrylic acid, maleic acid, fumaric acid, maleic anhydride and others.

Examples of the vinyl aromatic compound include, for example, styrene monomers such as styrene, α-methyl styrene, vinyl toluene and methoxystyrene, 2-vinyl pyridine, 4-vinyl pyridine and others.

Examples of the vinyl ester include, for example, vinyl acetate, vinyl propionate, vinyl octylate and others.

Examples of the vinyl ether include, for example, methyl vinyl ether, butyl vinyl ether, octyl vinyl ether, dodecyl vinyl ether and others.

Examples of the olefin include, for example, ethylene, propylene, 1-butene, isobutene, 1-tetradecene, 1-octadecene, diisobutene and others.

Examples of the vinyl cyanide include, for example, acrylonitrile, methacrylonitrile and others.

Examples of the N-vinyl compound include, for example, N-vinylpyrrolidone, N-vinylcaprolactam, N-vinylimidazole, N-vinylmorpholine, N-vinylacetamide and others.

Among these monofunctional monomers, (meth)acrylates other than the alkyl (meth)acrylates giving the unit (c) and the unit (d) and N-vinyl compounds are preferable as the unit (e), and 2-hydroxyethyl (meth)acrylate, N,N-dimethylaminoethyl (meth)acrylate, methyl α-hydroxymethylacrylate and N-vinylpyrrolidone are particularly preferable.

Examples of the multifunctional monomer include multifunctional (meth)acrylic compounds such as a multifunctional (meth)acrylate, a vinyl ether group-containing (meth)acrylate, an allyl group-containing (meth)acrylate, a multifunctional (meth)acryloyl group-containing isocyanurate and multifunctional urethane (meth)acrylate, a multifunctional maleimide compound, a multifunctional vinyl ether, a multifunctional allyl compound, a multifunctional aromatic vinyl compound and others. The unit (e) formed from these multifunctional monomers may be only one kind or two or more kinds.

Examples of the multifunctional (meth)acrylate include, for example, ethyleneglycol di(meth)acrylate, diethyleneglycol di(meth)acrylate, polyethyleneglycol di(meth)acrylate, hexanediol di(meth)acrylate, bisphenol-A alkylene oxide di(meth)acrylate, trimethylolpropane tri(meth)acrylate, 2,2'-[oxybis(methylene)]bisacrylic acid, dialkyl-2,2'-[oxybis(methylene)]bis-2-propenoate and others.

Examples of the vinyl ether group-containing (meth)acrylate include, for example, 2-vinyloxyethyl (meth)acrylate, 4-vinyloxybutyl (meth)acrylate, 2-(vinyloxyethoxy)ethyl (meth)acrylate and others.

Examples of the allyl group-containing (meth)acrylate include, for example, allyl (meth)acrylate, methyl α-allyloxymethylacrylate, stearyl α-allyloxymethylacrylate, 2-decyltetradecyl α-allyloxymethylacrylate and others.

Examples of the multifunctional (meth)acryloyl group-containing isocyanurate include, for example, tri(acryloyloxyethyl) isocyanurate, tri(methacryloyloxyethyl) isocyanurate and others.

Examples of the multifunctional urethane (meth)acrylate include, for example, a multifunctional urethane (meth)acrylate obtained by the reaction of a multifunctional isocyanate such as tolylene diisocyanate, isophorone diisocyanate and xylylene diisocyanate, with a hydroxyl group-containing (meth)acrylate ester such as 2-hydroxyethyl (meth)acrylate and 2-hydroxypropyl (meth)acrylate, and others.

Examples of the multifunctional maleimide compound include, for example, 4,4'-diphenylmethane bismaleimide, m-phenylene bismaleimide, bisphenol-A diphenyl ether bismaleimide, 1,6-bismaleimide-(2,2,4-trimethyl)hexane and others.

Examples of the multifunctional vinyl ether include, for example, ethyleneglycol divinyl ether, diethyleneglycol divinyl ether, polyethyleneglycol divinyl ether, hexanediol divinyl ether, bisphenol-A alkylene oxide divinyl ether, trimethylolpropane trivinyl ether and others.

Examples of the multifunctional allyl compound include, for example, multifunctional allyl ethers such as ethyleneglycol diallyl ether, diethyleneglycol diallyl ether, polyethyleneglycol diallyl ether, hexanediol diallyl ether, bisphenol-A alkylene oxide diallyl ether, trimethylolpropane triallyl ether and ditrimethylolpropane tetraallyl ether, multifunctional allyl group-containing isocyanurates such as triallyl isocyanurate; multifunctional allyl esters such as diallyl phthalate and diallyl diphenate; bisallylnadiimide compounds; bisallylnadiimide compounds and others.

Examples of the multifunctional aromatic vinyl compound include, for example, divinylbenzene and others.

The content of the unit (e) in the copolymer may be 0 parts by mass or more in 100 parts by mass of copolymer. In the case where the unit (e) is contained in the copolymer, the content thereof is preferably 1 parts by mass or more, more preferably 2 parts by mass or more, even more preferably 3 parts by mass or more, and preferably 50 parts by mass or less, more preferably 40 parts by mass or less, even more preferably 30 parts by mass or less, still even more preferably 20 parts by mass or less, particularly preferably 10 parts by mass or less in 100 parts by mass of the copolymer.

However, it is preferable that the copolymer does not contain a large amount of a styrene monomer-derived unit. This is because when the content of the styrene monomer-derived unit is increased, solubility of the viscosity index improver in a base oil tends to decrease and the viscosity index thereof tends to decrease. Therefore, the content of the styrene monomer-derived unit is preferably less than 3 parts by mass, more preferably 2 parts by mass or less, and even preferably 1 part by mass or less in 100 parts by mass of the copolymer. The styrene monomer includes not only styrene but also styrene analogues in which a substituent is bonded to a benzene ring or a vinyl group of styrene, and examples thereof includes, for example, styrene, α-methylstyrene, vinyltoluene and methoxystyrene.

In addition, since vinyl ethers, olefins and the like have poor radical copolymerizability with (meth)acrylate, it is preferable that the copolymer does not contain a large amount of the units derived from these monomers from the viewpoint of ease of production of the copolymer. For example, the total content of the unit (e) derived from these monomers is preferably 5 parts by mass or less, and more preferably 3 parts by mass or less in 100 parts by mass of the copolymer.

The content of the unit (e) derived from the multifunctional monomer in the copolymer is preferably 0 parts by mass or more and 5 parts by mass or less, more preferably 3 parts by mass or less, even more preferably 2 parts by mass in 100 parts by mass of the copolymer. When the content of the unit derived from the multifunctional monomer exceeds the above range, gelation may proceed during polymerization or solubility of the viscosity index improver containing the copolymer in a base oil may be deteriorated.

However, in the case of a multifunctional monomer which undergoes polymerization while cycling, such as 2,2'-[oxybis(methylene)]bisacrylic acid, dialkyl-2,2'-[oxybis(methylene)]bis-2-propenoate, methyl α-allyloxymethylacrylate, stearyl α-allyloxymethylacrylate and 2-decyltetradecyl α-allyloxymethylacrylate, the content of the unit derived from such multifunctional monomer in the copolymer may be 0 parts by mass or more and 30 parts by mass or less, or 20 parts by mass or less, or parts by mass or less, relative to 100 parts by mass of the copolymer. In this case, due to the effect of introducing a ring structure into the main chain, heat resistance of the viscosity index improver can be enhanced and the shear stability is improved.

The copolymer contained in the viscosity index improver may have a branch unit derived from a multifunctional chain transfer agent or a multifunctional polymerization initiator. When the copolymer has such a branch unit, it is possible to improve shear stability of the viscosity index improver without significantly impairing solubility in a base oil.

As the multifunctional chain transfer agent, a tri- or higher functional mercaptan is preferably used; and by radically copolymerizing the monomer components using such a chain transfer agent, a branch unit represented by the following formula (5) (that is, a chain transfer agent residue) is introduced into the copolymer. In the following formula (5), $L^1$ represents a m-valent organic residue, and m represents a number of 0 or more. The m is preferably 0 to 5.

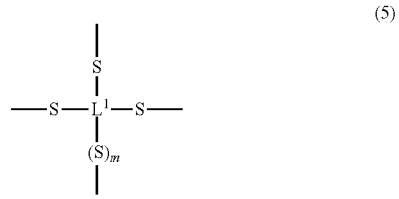

(5)

Examples of the tri- or higher functional mercaptan include polyester compounds formed from a compound having three or more hydroxyl groups and a carboxyl group-containing mercaptan such as trimethylolpropane tri-mercaptoacetate, trimethylolpropane tri(3-mercaptopropionate), pentaerythritol tetrakis(mercaptoacetate), pentaerythritol tetrakis(3-mercaptopropionate), dipentaerythritol hexakis(mercaptoacetate) and dipentaerythritol hexakis(3-mercaptopropionate), triazine multifunctional thiols, compounds having three or more mercapto groups per molecule obtained by adding hydrogen sulfide to a plurality of epoxy groups of a multifunctional epoxy compound, compounds having three or more mercapto groups per molecule obtained by esterifying a plurality of carboxyl groups of a multifunctional carboxylic acid and a mercaptoethanol, and the like. The copolymer may have only one kind of the branch unit derived from a tri- or higher functional chain transfer agent, or two or more kinds of that.

As the multifunctional polymerization initiator, a peroxide having three or more functional groups is preferably used; and by using such a multifunctional polymerization initiator as an initiator of radical polymerization, a branch unit represented by the following formula (6) (that is, an initiator residue) is introduced into the copolymer. In the following formula (6), $L^2$ represents a n-valent organic residue, and n represents a number of 0 or more. The n is preferably 0 to 5.

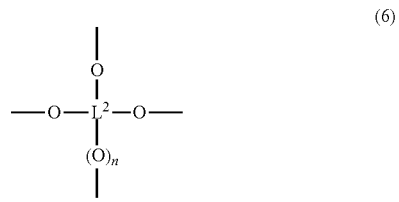

(6)

Examples of the tri- or higher functional polymerization initiator include, for example, organic peroxides having three or more functional groups such as 2,2-bis(4,4-t-butylperoxycyclohexyl)propane, tris(t-butylperoxy)triazine, 3,3',4,4'-tetra(t-butylperoxycarbonyl)benzophenone, and the like. The copolymer may have only one kind of the branch unit derived from the tri- or higher functional polymerization initiator, or two or more kinds of that.

The content (total content) of the branch unit derived from the multifunctional chain transfer agent and/or the multifunctional polymerization initiator is preferably 0.01 parts by mass or more, more preferably 0.02 parts by mass or more, even more preferably 0.05 parts by mass or more, and preferably 3 parts by mass or less, more preferably 2 parts by mass or less, even more preferably 1 parts by mass or less in 100 parts by mass of the copolymer. When the content of the branch unit is within such a range, molecular weight distribution of the copolymer becomes narrow and the shear stability improves. The copolymer may not have the branch unit derived from the multifunctional chain transfer agent and/or the multifunctional polymerization initiator.

The copolymer contained in the viscosity index improver of the present invention is preferably formed that: the viscosity of a solution composed of 78 mass % of a Group III base oil (a viscosity index is 122, kinematic viscosity at 40° C. is 19.6 mm²/s) on the American Petroleum Institute (API) classification and 22 mass % of the copolymer, measured with a viscometer (TVB-10 manufactured by Toki Sangyo Co., Ltd., rotor: SPINDLE No. M3, rotation speed is 6 rpm) at 25° C., is 8000 mPa·s or less. When the base oil solution of the copolymer has such viscosity, fluidity of the viscosity index improver at around room temperature is increased and handleability thereof is improved. The viscosity is preferably 7000 mPa·s or less, and more preferably 6000 mPa·s or less. The lower limit of the viscosity is not particularly limited, and may be, for example, 1 mPa·s or more. As the Group III base oil having a viscosity index of 122 and kinematic viscosity of 19.6 mm²/s at 40° C., YUBASE 4 manufactured by SK lubricants Co., Ltd. is used.

The copolymer contained in the viscosity index improver of the present invention is also preferably formed that: the viscosity of a solution composed of 80 mass % of a Group III base oil (a viscosity index is 122, kinematic viscosity at 40° C. is 19.6 mm²/s) on the American Petroleum Institute (API) classification and 20 mass % of the copolymer, measured with a viscometer (TVE-35H manufactured by Toki Sangyo Co., Ltd., rotor: 3°×R9.7, rotation speed is 50 rpm) at 25° C., is 25 Pa·s or less. When the base oil solution of the copolymer has such viscosity, fluidity of the viscosity index improver at around room temperature is increased and handleability thereof is improved. The viscosity is preferably 20 Pa·s or less, and more preferably 15 Pa·s or less. The lower limit of the viscosity is not particularly limited, and may be, for example, 0.1 Pa·s or more. As the Group III base oil having a viscosity index of 122 and a kinematic viscosity of 19.6 mm²/s at 40° C., YUBASE 4 manufactured by SK lubricants Co., Ltd. is used.

In the viscosity index improver, a part of the raw material for producing the copolymer may be contained together with the copolymer, as long as the performance of the viscosity index improver is not be greatly deteriorated; and for example, in the case that the viscosity index improver is produced without particularly purifying or highly purifying the copolymer obtained by the polymerization reaction, the raw material of the copolymer (for example, a monomer component, a polymerization initiator, a chain transfer agent and the like) is possibly contained in the viscosity index improver. In such a case, the copolymer concentration in the base oil solution of the copolymer used in the above viscosity measurement can be regarded as the concentration of the copolymer including the raw material of the copolymer. That is, the solution composed of a total of 22 mass % or 20 mass % of the copolymer and the raw material of the copolymer and 78 mass % or 80 mass % of the group III base oil may be used for viscosity measurement. The concentration of the copolymer including the raw material of the copolymer can be obtained, for example, by measuring the content of the base oil in the sample using a gel permeation chromatography.

The weight-average molecular weight (Mw) of the copolymer contained in the viscosity index improver is preferably 200,000 or more, more preferably 250,000 or more, even more preferably 300,000 or more, and preferably 700,000 or less, more preferably 650,000 or less, even more preferably 600,000 or less. When the weight-average molecular weight of the copolymer is small, a viscosity index of the base oil solution of the viscosity index improver tends to decrease, so that it becomes necessary to increase the used amount of the viscosity index improver in order to adjust the viscosity to a desired degree, that is disadvantageous in terms of cost. When the weight-average molecular weight of the copolymer is excessively large, solubility of the viscosity index improver in a base oil tends to decrease and shear stability of the viscosity index improver tends to decrease.

The number-average molecular weight (Mn) of the copolymer contained in the viscosity index improver is preferably 120,000 or more, more preferably 130,000 or more, and preferably 500,000 or less, more preferably 400,000 or less.

The molecular weight distribution (Mw/Mn) calculated from the Mw and the Mn of the copolymer is preferably 4.0 or less, more preferably 3.5 or less and even more preferably 3.0 or less. When the molecular weight distribution exceeds 4.0, solubility of the viscosity index improver in a base oil may become insufficient or shear stability of the lubricating oil composition may decrease. Meanwhile, the lower limit of the molecular weight distribution is preferably 1.0; however, in view of easily synthesis of the copolymer, the molecular weight distribution (Mw/Mn) is preferably 1.5 or more, more preferably 1.8 or more. The weight-average molecular weight (Mw) and the number-average molecular weight (Mn) of the copolymer are determined by the method described in the examples.

As a method for controlling the weight-average molecular weight and the number-average molecular weight, a known method can be employed. For example, it can be controlled by adjusting the amount and kind of the polymerization initiator or a polymerization catalyst, polymerization temperature, the kind and amount of the chain transfer agent, and the like. As a method of controlling the molecular weight distribution, living radical polymerization can also be employed. As a specific method, the RAFT method, the NMP method, the ATRP method and the like are famous. More information is outlined in Aldrich Material Matters, Vol. 5, No. 1, 2010. As an example of use, for example in the case of the RAFT method, 2,2'-azobisisobutyronitrile as a polymerization initiator and cumyl dithiobenzoate as a polymerization catalyst are used in Japanese Unexamined Patent Application Publication No. 2012-197399.

The glass transition temperature (Tg) of the copolymer contained in the viscosity index improver is preferably −50° C. or higher, more preferably −40° C. or higher, even more preferably −30° C. or higher, and preferably 0° C. or lower, more preferably −10° C. or lower, even more preferably −20° C. or lower. When the Tg of the copolymer is within such a range, solubility in a base oil is ensured when a base oil solution of the viscosity index improver is made and it is easy to enhance fluidity thereof at around room temperature while maintaining a high viscosity index.

The SP value (solubility parameter) of the copolymer contained in the viscosity index improver is preferably 8.8 or higher, more preferably 8.9 or higher, even more preferably 9.0 or higher, and preferably 9.6 or lower, more preferably 9.5 or lower, even more preferably 9.4 or lower. The SP value of a base oil generally has a value of about 8.0 to 8.5, and when the SP value of the copolymer is 8.8 or higher, the viscosity index of the lubricating oil composition is easily increased, and when the SP value of the copolymer is 9.6 or lower, solubility of the viscosity index improver in a base oil is easily ensured.

The viscosity index improver of the present invention is able to attain a viscosity index improvement effect and shear stability at a high level. As a specific numerical value of the shear stability, SSI obtained by the following method or decomposition starting temperature can be used as indices.

The SSI of the viscosity index improver is obtained by diluting the viscosity index improver (copolymer) in a base oil so that the kinematic viscosity at 100° C. is 7.0 mm$^2$/s, measuring kinematic viscosity at 100° C. before and after shearing treatment with an ultrasonic homogenizer and the base oil, and calculating from the following formula: SSI={1−(kinematic viscosity after the shearing treatment−kinematic viscosity of a base oil)/(kinematic viscosity before the shearing treatment−kinematic viscosity of a base oil)}×100. The SSI of the viscosity index improver is preferably 38 or less, more preferably 36 or less, and even more preferably 34 or less, whereby the shear stability and storage stability of the viscosity index improver are improved. The lower limit value of the SSI of the viscosity index improver is not particularly limited, and it is preferably 0.1 or more, more preferably 0.5 or more, even preferably 2 or more, and still even more preferably 5 or more. When the SSI is less than 0.1, a viscosity index improving effect of the viscosity index improver tends to decrease.

The viscosity index improver tends to have a higher viscosity index and higher shear stability as the concentration of the viscosity index improver (copolymer) in a base oil that was prepared by diluting the viscosity index improver (copolymer) in the base oil so as to have a kinematic viscosity at 100° C. of 7.0 mm$^2$/s is higher; and the concentration thereof is preferably 3.0 mass % or higher, more preferably 3.5 mass % or higher. Meanwhile the upper limit of the concentration is not particularly limited, and may be, for example, 10.0 mass % or lower.

The decomposition starting temperature of the copolymer contained in the viscosity index improver is preferably 250° C. or higher, more preferably 260° C. or higher, even more preferably 270° C. or higher, and preferably 500° C. or lower, more preferably 450° C. or lower, even more preferably 400° C. or lower. When the decomposition starting temperature of the viscosity index improver is raised, heat resistance is enhanced and the thermal decomposition stability and the shear stability are improved. Meanwhile, when the heat resistance is excessively increased, solubility of the viscosity index improver in the base oil tends to be insufficient and the viscosity index tends to decrease.

The viscosity index improver preferably has a viscosity index of 200 or more when the viscosity index improver (copolymer) is diluted with a base oil so that the kinematic viscosity thereof at 100° C. is 7.0 mm$^2$/s, more preferably 230 or more, even preferably 255 or more, and preferably 350 or less, more preferably 330 or less, even more preferably 310 or less. When the viscosity index of the viscosity index improver is within this range, it is excellent in fuel saving performance, heat/oxidation stability and storage stability. The viscosity index is measured according to the method of JIS K 2283.

The copolymer contained in the viscosity index improver preferably formed that: an intrinsic viscosity $[\eta]_{100}$ of the copolymer in a Group III base oil (a viscosity index is 122, kinematic viscosity at 40° C. is 19.6 mm²/s) on the American Petroleum Institute (API) classification at 100° C. is 0.07 dL/g or more and 0.17 dL/g or less, and an intrinsic viscosity $[\eta]_{40}$ of that at 40° C. is 0.01 dL/g or more and 0.08 dL/g or less. A viscosity index improver is usually blended in a lubricating oil so that the viscosity under high temperature and high shear conditions, where the oil film becomes the thinnest, is maintained at a certain level or higher. Particularly, a lubricating oil for internal combustion engines is used under conditions where high shearing force is applied between a cylinder and a cylinder head, and in such a condition, it becomes possible to keep the viscosity at low temperature lower while maintaining the lubricity under high temperature and high shear conditions by adjusting the intrinsic viscosity $[\eta]_{100}$ at 100° C. and the intrinsic viscosity $[\eta]_{40}$ at 40° C. within the above ranges. Specifically, provided that the viscosity index improver is added to a lubricating oil (base oil) so that the viscosity under a high temperature and high shear condition, where the oil film becomes the thinnest, is equal to or larger than a certain value, the viscosity under a low temperature and high shear condition or a low temperature and low shear condition can be suppressed to a lower level. Therefore, when the viscosity index improver has such intrinsic viscosities, a desirable effect of improving viscosity characteristics can be obtained under both high shear and low shear conditions in the environment where internal combustion engines are used, that is, for example, at temperature of 150° C. or lower.

Incidentally, it is difficult to reliably obtain the effect of improving viscosity characteristic under high shear conditions based only on the viscosity index, that is a basic performance index of the viscosity index improver. Viscosity of a lubricating oil decreases as the temperature rises, viscosity dependence of the lubricating oil decreases as the viscosity index improver is added thereto, and the viscosity index is used as an index that represents the difference between the viscosities at high temperature and low temperature under a low shear condition. Meanwhile, the viscosity of the lubricating oil also varies depending on shearing conditions, and the viscosity tends to decrease as it is under a high shear condition. The degree of change in viscosity due to the difference in the shearing conditions varies depending on the viscosity index improver blended in a lubricating oil, and it is difficult to predict this from the viscosity index, that is an index indicating temperature dependency of the viscosity. Therefore, a viscosity index improver having an excellent effect of improving the viscosity index does not necessarily exhibit decrease of the change in viscosity due to the difference in the shearing conditions, and it is important to adjust the intrinsic viscosity $[\eta]_{100}$ at 100° C. and the intrinsic viscosity $[\eta]_{40}$ at 40° C. to appropriate ranges in terms of exerting a favorable effect of improving viscosity characteristics even under high shear conditions.

The intrinsic viscosity $[\eta]_{100}$ at 100° C. is preferably 0.08 dL/g or more, more preferably 0.09 dL/g or more, and preferably 0.16 dL/g or less, more preferably 0.15 dL/g or less. The intrinsic viscosity $[\eta]_{400}$ at 40° C. is preferably 0.02 dL/g or more, more preferably 0.03 dL/g or more, and preferably 0.07 dL/g or less, more preferably 0.06 dL/g or less. In addition, it is preferable that the intrinsic viscosity $[\eta]_{100}$ at 100° C. is larger than the intrinsic viscosity $[\eta]_{40}$ at 40° C. As the Group III base oil having a viscosity index of 122 and kinematic viscosity of 19.6 mm²/s at 40° C., YUBASE 4 manufactured by SK lubricants Co., Ltd. can be used.

The intrinsic viscosity ratio $[\eta]_{100}/[\eta]_{40}$ of the copolymer contained in the viscosity index improver is preferably 1.7 or more, more preferably 1.9 or more, even more preferably 2.1 or more, and preferably 7.0 or less, more preferably 4.7 or less, even more preferably 3.8 or less, still even more preferably 3.5 or less. When the intrinsic viscosity ratio $[\eta]_{100}/[\eta]_{40}$ is within such a range, it becomes easy to suppress the viscosity at low temperature to a low level while ensuring the viscosity under a high temperature and high shear condition at a certain level or higher when adding the viscosity index improver to a lubricating oil.

The intrinsic viscosity of the copolymer in the viscosity index improver can be adjusted to a desired range by suitably setting the component of the copolymer. For example, as the content of the unit (a) increases, the intrinsic viscosity tends to decrease as a whole. As the content of the unit (b) increases, the intrinsic viscosity tends to decrease as a whole in the condition that the constituent components other than the unit (b) in the copolymer are the same. As the content of the unit (c) increases, the degree of change in the intrinsic viscosity with respect to temperature tends to increase. As the weight-average molecular weight increases, the intrinsic viscosity tends to increase as a whole.

The viscosity index improver of the present invention contains the above-described polymer as a main component, and preferably contains 70 mass % or more, more preferably 90 mass % or more, even more preferably 95 mass % or more, particularly preferably 99 mass % or more in 100 mass % of the viscosity index improver. The viscosity index improver may be composed of only the above-described copolymer. Examples of components other than the above-described copolymer contained in the viscosity index improver of the present invention include polymethacrylate, polyisobutylene, ethylene-propylene copolymer, styrene-diene hydrogenated copolymer, graft polymers of them, comb structure polymers, star structure polymers and the like.

The copolymer contained in the viscosity index improver of the present invention can be obtained by a production method comprising the step of radically polymerizing a monomer component containing a maleimide monomer giving the unit (a) and a macromonomer giving the unit (b) (that is referred to as a polymerization step). As a macromonomer forming the unit (b), a commercially available macromonomer may be used, or a macromonomer may be synthesized by a macromonomer synthesis step provided prior to the polymerization step.

As a method of polymerizing the monomer components in the polymerization step, any of, for example, bulk polymerization, solution polymerization, suspension polymerization, emulsion polymerization or the like can be employed; however, in consideration of handleability of the obtained polymer as the viscosity index improver, polymerization is preferably carried out by solution polymerization. In the case of using a dispersion medium, an emulsifying agent, a dispersing agent or the like, there is no particular limitation on them and known ones can be used.

In the polymerization step, a maleimide monomer forming the unit (a) and a macromonomer forming the unit (b) are essentially used as the monomer components, and an alkyl (meth)acrylate forming the unit (c), an alkyl (meth)acrylate forming the unit (d) and a monomer forming the unit (e) may be further used as the monomer components.

A solvent used for the polymerization is not particularly limited as long as it is inactive to the polymerization reaction, and can be appropriately selected according to the polymerization mechanism, the kind and amount of the monomer used, the kind and amount of the polymerization initiator or a polymerization catalyst and the like. From the viewpoint of ensuring solubility of the polymer and ease of solvent replacement to a base oil after polymerization, toluene, xylene, hexane, cyclohexane, methyl ethyl ketone or tetrahydrofuran is preferably used as the solvent for polymerization. Or, a lubricating base oil described below can also be suitably used as the solvent. In this case, solvent replacement after polymerization is unnecessary and the process is simplified, that is more preferable. These solvents may be used alone, or two or more of them may be used in combination. The used amount of the solvent is not particularly limited, and it is preferable that the concentration of the total amount of the monomer component, the polymerization initiator and other components is about 20 mass % or more and 100 mass % or less.

A polymerization initiator is preferably used in the polymerization. As the polymerization initiator, a known polymerization initiator can be used, and examples thereof include azo compounds such as 2,2'-azobisisobutyronitrile, 2,2'-azobis(2-amidinopropane) dihydrochloride, dimethyl-2,2'-azobis(2-methylpropionate) and 4,4'-azobis(4-cyanopentanoic acid); persulfates such as potassium persulfate; peroxides such as cumene hydroperoxide, diisopropylbenzene hydroperoxide, di-t-butyl peroxide, lauroyl peroxide, benzoyl peroxide, t-butyl peroxy isopropyl carbonate, t-amyl peroxy-2-ethylhexanoate, t-amyl peroxyoctoate and t-amyl peroxyisononanoate; and others. In addition, the above-described multifunctional polymerization initiator can also be used. These may be used alone, or two or more of them may be used in combination. The use amount of the polymerization initiator is preferably, for example, 0.01 to 3 parts by mass relative to 100 parts by mass of the monomer component.

In the polymerization step, a chain transfer agent or the like may be used. Use of the chain transfer agent makes it easier to obtain the copolymer having a small molecular weight distribution. In addition, thermal decomposition by depolymerization is easily suppressed. Examples of the chain transfer agent include mercaptans such as butane thiol, octane thiol, octadecane thiol, dodecane thiol, cyclohexyl mercaptan, thiophenol, octyl thioglycolate, octyl 2-mercaptopropionate, octyl 3-mercaptopropionate, 2-ethylhexyl mercaptopropionate, 2-mercaptoethyl octanoate, 1,8-dimercapto-3,6-dioxaoctane, dodecyl mercaptan and ethylene glycol bisthioglycolate; halogen compounds such as carbon tetrachloride, carbon tetrabromide, methylene chloride, bromoform and bromotrichloroethane; α-methylstyrene dimer and others. In addition, the above-described multifunctional chain transfer agent can also be used. The use amount of the chain transfer agent is preferably, for example, 0.01 to 3 parts by mass relative to 100 parts by mass of the monomer component.

Temperature of the polymerization reaction may be appropriately adjusted according to the kinds of the polymerization solvent and the progress of the polymerization reaction, and is preferably 0° C. or higher, more preferably 25° C. or higher, and preferably 200° C. or lower, more preferably 155° C. or lower. Time of the polymerization reaction may be appropriately adjusted depending on the progress of the polymerization reaction, and it may be, for example, 1 to 48 hours (preferably 3 to 24 hours).

In the polymerization step, polymerization may be started after setting all the monomers in the system, or a part of the monomers may be continuously or intermittently added during polymerization. The monomer to be added during the polymerization may be only one kind or may be two or more kinds.

At the end of the polymerization step, a polymerization ratio of the maleimide monomer is preferably 95% or more, more preferably 97% or more, even more preferably 99% or more. Thereby, volatilization of the maleimide monomer in handling is suppressed and concern of influencing the human body or the environment is reduced. At the end of the polymerization step, a polymerization ratio of the macromonomer is preferably 82% or more, more preferably 83% or more, even more preferably 84% or more. This improves solubility in a base oil, a viscosity index, shear stability, and handleability when formed into a base oil solution.

In the case of conducting a macromonomer synthesis step, it is preferable that a compound having a macrohydrocarbon group described above and a functional group selected from the group consisting of hydroxyl, amino, carboxyl, carboxylic acid ester group, isocyanate group and sulfo group (that is referred to as a "macro compound") is reacted with a compound having a reactive group with the above functional group and a polymerizable double bond (that is referred to as a "counter compound") to synthesize the macromonomer. Reaction of the macro compound with the counter compound (addition reaction or condensation reaction) is conducted and the resultant macromonomer is polymerized with other monomer components in the polymerization step, whereby the macrohydrocarbon group derived from the macro compound is incorporated into the copolymer.

The functional group of the macro compound is preferably hydroxyl, carboxyl, or carboxylic acid ester group in view of ease of production and availability. The macro compound preferably has only one such functional group, and more preferably has such functional group at a terminal of the macro compound.

Examples of the reactive group of the counter compound include hydroxyl, amino, carboxyl, carboxylic acid ester group, isocyanate group, sulfo group, oxazoline group, and others. The counter compound preferably has only one such reactive group. Examples of the counter compound include (meth)acrylates such as 2-isocyanatoethyl (meth)acrylate, 2-hydroxyethyl (meth)acrylate and 3-sulfopropyl (meth)acrylate; (meth)acrylic acid; vinyl ethers such as 2-hydroxyethyl vinyl ether and 2,2-dimethyl-2-isocyanatoethyl vinyl ether; styrenes such as 4-aminostyrene and 4-vinylbenzene sulfonic acid; 2-isopropenyl-2-oxazoline and others.

Examples of the reaction between the macro compound and the counter compound include an urethanization reaction in which isocyanate group reacts with hydroxyl group, an urea formation reaction in which isocyanate group reacts with amino group, an esterification reaction in which carboxyl group reacts with hydroxyl group, an amidation reaction in which carboxyl group reacts with amino group, a sulfonate esterification reaction in which sulfo group reacts with hydroxyl group, a sulfonamidation reaction in which sulfo group reacts with amino group, a transesterification reaction in which esterified carboxyl group reacts with hydroxyl group, an amide esterification reaction in which oxazoline group reacts with carboxyl group, and the like. Among them, an urethanization reaction, an urea formation reaction, an esterification reaction, a transesterification reaction, or an amidation reaction is preferable, and from the viewpoint of excellent reactivity, an urethanization reaction is particularly preferable.

In the macromonomer synthesis step, the reaction between the macro compound and the counter compound is preferably carried out in the presence of a metal catalyst.

Thereby, the macromonomer can be efficiently produced from the macro compound and the counter compound, and the reaction time can be shortened. Further, in the subsequent polymerization step, even if the metal which is derived from the metal catalyst remains in the reaction solution, the polymerization reaction of the monomer components including the macromonomer can be suitably carried out.

The metal catalyst is not particularly limited as long as it promotes the reaction between the macro compound and the counter compound, and it is preferable to use a metal catalyst containing at least one metal element selected from the group consisting of titanium, zirconium, zinc, tin and bismuth, more preferable to use a titanium catalyst and/or a tin catalyst. When a titanium catalyst and/or a tin catalyst is used, the reaction of the macro compound with the counter compound proceeds rapidly in the macromonomer synthesis step, and even if the metal derived from these catalysts remains in the reaction solution used in the subsequent polymerization step, the polymerization ratio of the macromonomer can be enhanced and the polymer having a higher molecular weight is easily obtained.

The metal catalyst preferably has a group or a ligand containing a group 16 element. In this case, the group 16 element contained in the group or the ligand is preferably bound or coordinated to a metal atom of the metal catalyst. Examples of the group 16 element include oxygen, sulfur, selenium, tellurium and the like, and among them, a group or a ligand containing oxygen or sulfur is preferable. Examples of such a group or a ligand include an alkoxy group, an aryloxy group, an acyloxy group, an acylate group, a catecholate group, a thiol group, a thiocyanate group and the like, and a group or a ligand containing oxygen is particularly preferably used.

Synthesis of the macromonomer is preferably carried out in a solvent. As the solvent, a solvent usable in the polymerization reaction can be used, and a lubricating base oil can be also suitably used. The use amount of the reaction solvent in the macromonomer synthesis step is not particularly limited, and it is preferably such that the total concentration of the macro compound and the counter compound in the reaction solution is about from 5 mass % to 70 mass %.

In the case that the synthesis of the macromonomer is carried out in a lubricating base oil, the lubricating base oil can be used as a reaction solvent also in the polymerization step. Thereby, the macromonomer synthesis step and the polymerization step can be simplified and it becomes unnecessary to replace the solvent after polymerization, and so it is possible to easily produce the viscosity index improver of the present invention. In this case, a polymerization step of polymerizing monomer components including a macromonomer may be conducted in the solvent (lubricating base oil) used in the macromonomer synthesis step in the presence of the metal derived from the metal catalyst used in the macromonomer synthesis step.

Temperature at which the macro compound and the counter compound are reacted may be appropriately adjusted according to the kinds of the reaction solvent and the progress of the reaction, and it is preferably, for example, 0° C. or higher, more preferably 25° C. or higher, and preferably 180° C. or lower, more preferably 155° C. or lower. The reaction time may be appropriately adjusted depending on the progress of the reaction, and it may be, for example, 20 minutes to 16 hours (preferably 30 minutes to 12 hours).

[2. Composition Containing Viscosity Index Improver and Base Oil]

The present invention also provides a lubricating oil composition containing the viscosity index improver of the present invention. Blending the viscosity index improver of the present invention with a lubricating base oil gives a lubricating oil composition. The lubricating oil composition may be used as a lubricating oil without further diluted with a lubricating base oil or may be diluted with a lubricating base oil to use as a lubricating oil. In the latter case, the lubricating oil composition is used as a stock solution, that may hereinafter be referred to as a "base oil composition".

As the lubricating base oil, a known lubricating base oil can be used without particular limitation, and a mineral base oil and a synthetic base oil are suitably cited. Examples of the mineral base oil include a paraffin-base base oil and a naphthen-base base oil. The mineral base oil include one that obtained by subjecting a raw material base oil to solvent refining, hydrocracking or hydroisomerization treatment. Examples of the synthetic base oil include a hydrocarbon-base base oil, an ester-base base oil, an ether-base base oil, a silicone-base base oil and a fluorine-base base oil. As described above, the lubricating base oil can also be used as the solvent for polymerization for obtaining the copolymer contained in the viscosity index improver.

Specific preferable examples of the mineral base oil include base oils obtained by purifying the following base oils (1) to (7) as raw material oils and/or a lubricating oil fraction recovered from this raw material oil using a predetermined purification method and recovering a lubricating oil fraction. Specifically, the following base oils (8) and (9), which are obtained by subjecting a base oil selected from the following (1) to (7) or a lubricating oil fraction recovered from this base oil to a predetermined treatment, are preferable.

(1) distillate oil (WVGO) obtained by vacuum distillation of an atmospheric distillation residual oil of a paraffin-base crude oil and/or a mixed-base crude oil;

(2) wax obtained by a dewaxing process of a lubricating oil (slack wax and the like) and/or synthetic wax obtained by a gas to liquid (GTL) process and the like (Fischer Tropsch wax, GTL wax, and the like);

(3) mixed oil of one or more kinds selected from the base oils (1) to (2) and/or a mild hydrocracking-treated oil of this mixed oil;

(4) mixed oil of two or more kinds selected from the base oils (1) to (3);

(5) deasphalted oil (DAO) of any one of the base oils (1) to (4);

(6) mild hydrocracking-treated oil (MHC) of the base oil (5);

(7) mixed oil of two or more kinds selected from the base oils (1) to (6);

(8) hydrocracked mineral oil obtained by hydrocracking the base oil selected from the base oils (1) to (7) or a lubricating oil fraction recovered from this base oil, subjecting its product or a lubricating oil fraction recovered from its product by distillation or the like to a dewaxing treatment such as solvent dewaxing or catalytic dewaxing, and further optionally distilling after the dewaxing treatment;

(9) hydroisomerized mineral oil obtained by hydroisomerizing the base oil selected from the base oils (1) to (7) or a lubricating oil fraction recovered from this base oil, subjecting its product or a lubricating oil fraction recovered from its product by distillation or the like to a dewaxing treatment such as solvent dewaxing or catalytic dewaxing, and further optionally distilling after the dewaxing treatment.

Specific examples of the synthetic base oil include poly-α-olefins or hydrides thereof, isobutene oligomers or hydrides thereof, isoparaffins, alkylbenzenes, alkylnaphthalenes, diesters such as ditridecylglutarate, di-2-ethylhexyl adipate, diisodecyl adipate, ditridecyl adipate and di-2-ethylhexyl sebacate, polyol esters such as trimethylolpropane caprylate, trimethylolpropane pelargonate, pentaerythritol 2-ethylhexanoate and pentaerythritol pelargonate, polyoxyalkylene glycols, dialkyl diphenyl ethers, polyphenyl ethers and others; and among them, poly-α-olefins are preferable. Typical examples of the poly-α-olefin include oligomers or co-oligomers of α-olefin having 2 to 32 carbon atoms, preferably 6 to 16 carbon atoms, such as 1-octene oligomer, decene oligomer and ethylene-propylene co-oligomer, and hydrides thereof.

Kinematic viscosity at 100° C. of the mineral base oil and the synthetic base oil described above is preferably 1 to 20 mm$^2$/s.

As the lubricating base oil to be blended in the lubricating oil composition, the mineral base oil is preferred in view of cost and availability. Among the mineral base oil, the base oil (8) or (9), that is obtained by subjecting the base oil selected from the base oils (1) to (7) or a lubricating oil fraction recovered from this base oil to the above-described treatment, is preferable. It is also preferred to use base oils belonging to the Group III based on the classification by the American Petroleum Institute (API). As the lubricating base oil to be blended in the lubricating oil composition, the synthetic base oil described above may be used.

In the lubricating oil composition of the present invention, the above-described lubricating base oil may be used singly or in combination with one or more of other base oils. In the case of using the lubricating base oil and another base oil in combination to prepare a mixed base oil, the mixed base oil preferably contains at least the lubricating base oil (8) or (9). The ratio of the lubricating base oil (8) or (9) in the mixed base oil is preferably 30 mass % or more, more preferably 50 mass % or more and even more preferably 70 mass % or more.

The viscosity index of the lubricating base oil is preferably 100 or more, more preferably 120 or more, and is preferably 160 or less. When the viscosity index is less than the above lower limit value, friction coefficient tends to increase, thereby decreasing anti-wear property, as well as viscosity-temperature characteristic, the heat/oxidation stability and volatilization prevention property deteriorate. When the viscosity index exceeds the above upper limit value, low-temperature viscosity characteristic tends to deteriorate. The viscosity index referred to in the present invention means a viscosity index measured in accordance with JIS K 2283.

The viscosity index of the lubricating oil composition is preferably 200 or more, more preferably 230 or more, even more preferably 255 or more, and is preferably 400 or less, more preferably 350 or less, even more preferably 300 or less. When the viscosity index is within this range, it is excellent in fuel economy, heat/oxidation stability and storage stability.

The content of the copolymer according to the present invention in the lubricating oil composition is not particularly limited, and for example, it is preferably 0.01 parts by mass or more, more preferably 0.1 parts by mass or more, even more preferably 0.5 parts by mass or more, and is preferably 70 parts by mass or less, more preferably 60 parts by mass or less, even more preferably less than 50 parts by mass, relative to 100 parts by mass of the lubricating oil composition. In the case where the lubricating oil composition is used as a lubricating oil without further being diluted with a lubricating base oil, the content of the copolymer according to the present invention in the lubricating oil composition is preferably 0.01 parts by mass or more, more preferably 0.1 parts by mass or more, even more preferably 0.5 parts by mass or more, and is preferably 20 parts by mass or less, more preferably 15 parts by mass or less, even more preferably 10 parts by mass or less, relative to 100 parts by mass of the lubricating oil composition. In the case where the lubricating oil composition of the present invention is used as the base oil composition, the content of the copolymer according to the present invention in the base oil composition is preferably, for example, parts by mass or more, more preferably 10 parts by mass or more, even more preferably 20 parts by mass or more, and is preferably 70 parts by mass or less, more preferably 60 parts by mass or less, even more preferably less than 50 parts by mass, relative to 100 parts by mass of the lubricating oil composition.

The lubricating oil composition of the present invention contains the viscosity index improver of the present invention and a lubricating base oil as essential components and may further contain optional additives and others. For example, the lubricating oil composition preferably further contains at least one additive selected from the group consisting of a pour point depressant, an anti-wear agent, a metal-base detergent dispersant, an ashless detergent dispersant, an antioxidant, a corrosion inhibitor, an antifoaming agent, a friction modifier, a rust inhibitor, a demulsifier and a metal deactivator.

As the pour point depressant, any pour point depressant used for lubricating oils can be used. Examples of the pour point depressant include, for example, polymethacrylates, naphthalene-chlorinated paraffin condensation products, phenol-chlorinated paraffin condensation products, and others. Among them, polymethacrylates are preferable.

As the anti-wear agent (or an extreme pressure agent), any anti-wear agent or extreme pressure agent used for lubricating oils can be used. As the anti-wear agent (or the extreme pressure agent), a sulfur-base extreme pressure agent, a phosphorus-base extreme pressure agent and sulfur-phosphorus-base extreme pressure agent can be used, for example; and specific examples thereof include zinc dialkyl dithiophosphate (ZnDTP), phosphite esters, thiophosphite esters, dithiophosphite esters, trithiophosphite esters, phosphate esters, thiophosphate esters, dithiophosphate esters, trithiophosphate esters, amine salts of them, metal salts of them, derivatives of them, dithiocarbamate, zinc dithiocarbamate, MoDTC, disulfides, polysulfides, sulfurized olefins, sulfurized greases and others. Among them, sulfur-base extreme pressure agents are preferable, and sulfurized greases are particularly preferable.

Examples of the metal-base detergent dispersant include a normal salt or a basic salt such as an alkali metal/alkaline earth metal sulfonate, an alkali metal/alkaline earth metal phenate, an alkali metal/alkaline earth metal salicylate and others. Examples of the alkali metal include sodium, potassium and others, and examples of the alkaline earth metal include magnesium, calcium, barium and others; and magnesium or calcium is preferable, and calcium is particularly preferable.

As the ashless detergent dispersant, any ashless detergent dispersant used in lubricating oils can be used. Examples of the ashless detergent dispersant include, for example, mono- or bis-succinimides having at least one linear or branched alkyl or alkenyl group of 40 to 400 carbon atoms in the molecule, benzylamines having at least one alkyl or alkenyl group of 40 to 400 carbon atoms in the molecule, polyamines having at least one alkyl or alkenyl group of 40 to 400 carbon atoms in the molecule, boron compounds of them, derivatives of them with carboxylic acid, phosphoric acid or the like, and others. In use, one or more kinds arbitrarily selected from these can be blended.

Examples of the antioxidant include ashless antioxidants such as phenolic or amine-base antioxidants and metal-base antioxidants such as copper or molybdenum-base antioxidants. Examples of the antioxidant include, for example, phenol-base ashless antioxidants such as 4,4'-methylenebis (2,6-di-tert-butylphenol) and 4,4'-bis(2,6-di-tert-butylphenol), amine-base ashless antioxidants such as phenyl-α-naphthylamine, alkylphenyl-α-naphthylamine and dialkyldiphenylamine, and others.

Examples of the corrosion inhibitor include, for example, benzotriazole compounds, tolyltriazole compounds, thiadiazole compounds, imidazole compound and others.

Examples of the antifoaming agent include, for example, silicone oils having kinematic viscosity at 25° C. of 1,000 to 100,000 $mm^2/s$, fluorosilicone oils, alkenylsuccinic acid derivatives, esters of a polyhydroxyaliphatic alcohol and a long-chain fatty acid, methyl salicylate, o-hydroxybenzyl alcohol and others.

Examples of the friction modifier include organic molybdenum compounds such a succinimide molybdenum complex (e.g. molybdenum dithiocarbamate, molybdenum dithiophosphate and the like) and an amine salt of an organic molybdic acid, and compounds having a linear alkyl group of 8 to 30 carbon atoms and a polar group that can be adsorbed on a metal in the molecule. Examples of the polar group include amines, polyamines, amides, amine compounds which simultaneously have these groups in the molecule, fatty acid esters, fatty acid amides, fatty acids, aliphatic alcohols, aliphatic ethers, urea compounds, hydrazide compounds, alkenyl succinimide esters, alcohols or diols, monoalkyl glycerin ester having both an ester and a hydroxyl group, and others. In addition, various compounds such as alkylamine alkoxy alcohols having both an amine group and a hydroxyl group in the molecule are also exemplified.

Examples of the rust inhibitor include, for example, petroleum sulfonate, alkylbenzene sulfonate, dinonyl naphthalene sulfonate, alkenyl succinate ester, polyhydric alcohol ester and others.

Examples of the demulsifier include, for example, polyalkylene glycol nonionic surfactants such as polyoxyethylene alkyl ether, polyoxyethylene alkyl phenyl ether and polyoxyethylene alkyl naphthyl ether.

Examples of the metal deactivator include, for example, imidazoline, pyrimidine derivatives, alkylthiadiazoles, mercaptobenzothiazole, benzotriazole or derivatives thereof, 1,3,4-thiadiazole polysulfide, 1,3,4-thiadiazolyl-2,5-bisdialkyl dithiocarbamate, 2-(alkyldithio)benzimidazole, β-(o-carboxybenzylthio)propionenitrile and others.

In the case where the lubricating oil composition contains one or more kinds selected from the group consisting of a pour point depressant, an anti-wear agent, a metal-base detergent dispersant, an ashless detergent dispersant, an antioxidant, a corrosion inhibitor, an antifoaming agent, a friction modifier, a rust inhibitor, a demulsifier and a metal deactivator, the content of each is preferably 0.01 parts by mass or more and 10 parts by mass or less, relative to 100 parts by mass of the lubricating oil composition.

In the case where the lubricating oil composition contains a metal-base detergent dispersant, the content of the metal-base detergent dispersant is preferably 0.01 parts by mass or more and less than 30 parts by mass, relative to 100 parts by mass of the lubricating oil composition. When the content of that is less than 0.01 parts by mass, the fuel saving effect may be sustained only for a short period of time, and when the content of that is 30 parts by mass or more, it is difficult to obtain an effect commensurate with the content.

In the case where the lubricating oil composition contains an antifoaming agent, the content of the antifoaming agent is preferably 0.0001 parts by mass or more and 0.01 parts by mass or less, relative to 100 parts by mass of the lubricating oil composition.

In the case where the lubricating oil composition contains a friction modifier, the content of the friction modifier is preferably 0.01 parts by mass or more and 3 parts by mass or less, relative to 100 parts by mass of the lubricating oil composition. When the content of that is less than 0.01 parts by mass, a friction reducing effect due to its addition tends to be insufficient, and when the content of that exceeds 3 parts by mass, effects of other additives tends to be hindered or solubility of the additives tends to be deteriorated.

In the case where the lubricating oil composition is used as the base oil composition, the base oil composition may substantially consist of the viscosity index improver and a lubricating base oil, and in this case, the total content of the viscosity index improver and the lubricating base oil is preferably, for example, 98 parts by mass or more, more preferably 99 parts by mass or more and even more preferably 99.5 parts by mass or more, relative to 100 parts by mass of the lubricating oil composition. In particular, it is preferable that the base oil composition is constituted so that the total content of the copolymer described above and a lubricating base oil falls within such a range.

The lubricating oil composition may further contain a viscosity index improver other than the copolymer of the present invention, in addition to the above components. The viscosity index improver other than the copolymer of the present invention is specifically a non-dispersible or dispersible ester group-containing viscosity index improver, and examples of that include a non-dispersible or dispersible poly(meth)acrylate-base viscosity index improver, a non-dispersible or dispersible olefin-(meth)acrylate copolymer-base viscosity index improver, a styrene-maleic anhydride ester copolymer-base viscosity index improver, mixtures thereof, and others. Among them, a non-dispersible or dispersible poly(meth)acrylate-base viscosity index improver is preferable, and a non-dispersible or dispersible polymethacrylate viscosity index improver is more preferable. Other examples of that include non-dispersible or dispersible ethylene-α-olefin copolymers or hydrides thereof, polyisobutylene or hydrides thereof, styrene-diene hydrogenated copolymers, polyalkylstyrene and others.

This application claims priority to Japanese Patent Application No. 2016-184783, filed on Sep. 21, 2016, and Japanese Patent Application No. 2017-060691, filed on Mar. 27, 2017. All of the contents of the Japanese Patent Application No. 2016-184783, filed on Sep. 21, 2016, and Japanese Patent Application No. 2017-060691, filed on Mar. 27, 2017, are incorporated by reference herein.

EXAMPLES

The present invention will be hereinafter described more specifically by reference to Examples; however, the present invention is not limited to these Examples.

(1) Analysis and Evaluation Method

(1-1) Weight-Average Molecular Weight and Number-Average Molecular Weight

Weight-average molecular weight and number-average molecular weight of the copolymer were determined using gel permeation chromatography (HLC-8320 GPC ECOSEC, manufactured by Tosoh Corporation). The measurement conditions are as follows.
- Column: TSKgel GMHXL×2, manufactured by Tosoh Corporation
- Developing solvent: tetrahydrofuran
- Flow rate of developing solvent: 1.0 ml/min
- Standard sample: TSK standard polystyrene (PS-oligomer kit, manufactured by Tosoh Corporation)
- Column temperature: 40° C.
- Sample concentration: 0.5%
- Injection volume: 200 μL

(1-2) Polymerization Ratio of Each Monomer Component Other than Macromonomer Polymerization ratios of respective monomer components other than a macromonomer were determined using a gas chromatography (GC-2010 plus, manufactured by Shimadzu Corporation). Specifically, calibration curve solutions in which each monomer and tridecane were dissolved in ethyl acetate were prepared and measured by the gas chromatography, and a calibration curve was obtained from these peak areas. Subsequently, a sample solution prepared by dissolving a copolymer solution and tridecane in ethyl acetate was prepared, and the measurement was similarly carried out using the gas chromatography. The polymerization ratios of respective monomer components were determined by the internal standard method.

Measurement conditions of the gas chromatography are shown below.
- Column: Inert Cap 1 manufactured by GIL Science (liquid phase film thickness: 0.25 μm, length: 30 m, inner diameter: 0.25 mm)
- Temperature: 40° C. (5 minutes holding)+40° C. to 170° C. (10° C./min)+170° C. to 210° C. (5° C./min)+210° C. to 330° C. (15° C./min)+330° C. (20 minutes holding)
- Vaporizing chamber temperature: 200° C.
- Detector temperature: 350° C. (FID)
- Carrier gas: helium (column flow rate 1.33 mL/min)
- Injection volume: 0.5 μL (split method, split ratio: 30.0)
- Internal standard sample: tridecane
- Diluent solvent: ethyl acetate

(1-3) Content of Macromonomer and Polymerization Ratio Thereof

Content of a macromonomer and a polymerization ratio thereof were determined using a gel permeation chromatography (HLC-8320 GPC ECOSEC, manufactured by Tosoh Corporation). Specifically, a calibration curve solution was prepared by dissolving a macromonomer in tetrahydrofuran and measured by the gel permeation chromatography, and a calibration curve was obtained from the peak area. Subsequently, a sample solution in which the copolymer solution was dissolved in tetrahydrofuran was prepared and measured in the same manner. From the thus obtained peak area of the macromonomer, the content of the macromonomer in the copolymer solution was obtained and the content (mass %) of macromonomer relative to the total amount of macromonomer supplied in the system was obtained. From the content of the macromonomer in the copolymer solution, the amount of the copolymer solution used for analyzing the content of the macromonomer in the copolymer solution, the total amount of the macromonomer added to the polymerization system and the total amount of the solution in the polymerization system, the polymerization ratio of the macromonomer was calculated according to the following formula: the polymerization ratio of the macromonomer (mass %)=[1−{(macromonomer content in copolymer solution× total solution amount in polymerization system/amount of copolymer solution used for analysis)/total amount of macromonomer added to polymerization system}]×100. The measurement conditions were as follows.
- Column: TSKgel GMHXL×2, manufactured by Tosoh Corporation
- Developing solvent: tetrahydrofuran
- Flow rate of developing solvent: 1.0 mL/min
- Standard sample: TSK standard polystyrene (PS-oligomer kit, manufactured by Tosoh Corporation)
- Column temperature: 40° C.
- Sample concentration: 0.5%
- Injection volume: 200 μL

(1-4) Base Oil Solubility 4 parts by mass of a copolymer and 96 parts by mass of a base oil (YUBASE 4, manufactured by SK lubricants Co., Ltd.) were blended to prepare a base oil solution of the copolymer, and the resultant was stirred at room temperature for 1 hour. The presence or absence of precipitate was visually observed, and in the case where precipitate or an insoluble matter was not confirmed, the solubility was evaluated as A. In the case where precipitate or an insoluble matter was confirmed, the solution was heated at 80° C. for 30 minutes while stirring. Thereafter, the base oil solution of the copolymer was cooled to room temperature and the presence or absence of precipitate was visually observed. Solubility when precipitate was confirmed was evaluated as C, and solubility when precipitate was not confirmed was evaluated as B. The oil of YUBASE 4 manufactured by SK lubricants Co., Ltd. is a Group III base oil (viscosity index: 122, kinematic viscosity at 40° C.: 19.6 mm$^2$/s) on the American Petroleum Institute (API) classification.

(1-5) Viscosity (I)

A solution composed of 78 mass % of a Group III base oil (YUBASE 4, manufactured by SK lubricants Co., Ltd., viscosity index: 122, kinematic viscosity at 40° C.: 19.6 mm$^2$/s) on the American Petroleum Institute (API) classification and 22 mass % of a copolymer (including a copolymer raw material) was measured with a viscometer (TVB-10, manufactured by Toki Sangyo Co., Ltd., rotor: SPINDLE No. M3, rotation speed: 6 rpm) at 25° C. In the case where the viscosity was 8000 mPa·s or less, it was evaluated as A, and in the case where the viscosity exceeded 8000 mPa·s, it was evaluated as C.

(1-6) Viscosity (II)

A solution composed of 80 mass % of a Group III base oil (YUBASE 4, manufactured by SK lubricants Co., Ltd., viscosity index: 122, kinematic viscosity at 40° C.: 19.6 mm$^2$/s) on the American Petroleum Institute (API) classification and 20 mass % of a copolymer (including a copolymer raw material) was measured with a viscometer (TVE-35H, manufactured by Toki Sangyo Co., Ltd., rotor: 3°×R9.7, rotation speed: 50 rpm) at 25° C. In the case where the viscosity was 25 Pa·s or less, it was evaluated as A, and in the case where the viscosity exceeded 25 Pa·s, it was evaluated as C.

(1-7) Viscosity Index

Copolymer was diluted with a base oil (YUBASE 4, manufactured by SK lubricants Co., Ltd.) so that the kinematic viscosity at 100° C. was 7.0 mm²/s, and a viscosity index was measured according to the method of JIS K 2283.

(1-8) Shear Stability

Copolymer was diluted with a base oil (YUBASE 4, manufactured by SK lubricants Co., Ltd.) so that the kinematic viscosity at 100° C. was 7.0 mm²/s to obtain a base oil solution of the copolymer, and ultrasonic irradiation was applied thereto for 10 minutes by an ultrasonic homogenizer (Hielscher UP400S, manufactured by Ultrasonics GmbH) under the condition of Amplitude=70%, cycle=1 while keeping the temperature at 100° C., thereby conducting shearing treatment. The kinematic viscosity at 100° C. of a base oil and before and after the shearing treatment were measured, and shear stability (SSI) was calculated from the following equation: SSI={1−(kinematic viscosity after the shearing treatment−kinematic viscosity of a base oil)/(kinematic viscosity before the shearing treatment−kinematic viscosity of a base oil)}×100. In the case where the value of the SSI was 40 or less, it was judged as A, and in the case where the value of the SSI exceeded 40, it was judged as C.

(1-9) Intrinsic Viscosity

Base oil solutions of a copolymer obtained by diluting with a base oil (YUBASE 4, manufactured by SK lubricants Co., Ltd.) so that the copolymer concentration was 0.25 mass %, 0.5 mass %, 0.75 mass % or 1.0 mass %, and the base oil (YUBASE 4, manufactured by SK lubricants Co., Ltd.) were prepared, and kinematic viscosities at 40° C., 60° C., 80° C. and 100° C. and densities thereof were measured using a kinematic viscosimeter (SVM (registered trademark) 3000, manufactured by Anton Paar Co., Ltd.). Intrinsic viscosity [η] was obtained as follows that: plotting {(H/η0)−1}/c at each concentration wherein the concentration of the base oil solution of the copolymer was c (g/dL), the kinematic viscosity was η(mm²/s) and the kinematic viscosity of the base oil was η0, calculating an approximation straight line therefrom, and obtaining the value at c=0 as the intrinsic viscosity.

(2) Preparation Example of Macromonomer

Into a reaction vessel equipped with a stirrer, a temperature sensor, a cooling pipe, a nitrogen inlet tube and a dropping funnel, 50 parts by mass of hydrogenated polybutadiene containing hydroxyl group at one terminal thereof (Krasol HLBH-5000M, manufactured by TOTAL), 1.6 parts by mass of 2-isocyanatoethyl methacrylate (Karenz MOI, manufactured by Showa Denko KK), 20 parts by mass of toluene and 0.1 parts by mass of dibutyl tin dilaurate were fed, and the content was stirred for 6 hours while heating at 65° C. with an oil bath and introducing nitrogen gas thereto. After the completion of the reaction, 50 parts by mass of water was added thereto, and the supernatant liquid was recovered with a separating funnel and was raised to 65° C. to remove toluene therefrom under reduced pressure, thereby obtaining 48 parts by mass of a macromonomer shown in Table 1.

The obtained macromonomer was dissolved in deuterated chloroform (available from Wako Pure Chemical Industries, Ltd.), and ¹H-NMR measurement was carried out using a nuclear magnetic resonance spectrometer (Unity Plus 400, manufactured by Varian Co.). No peak in the vicinity of 3.9 ppm attributable to an alcohol group of the raw material was confirmed, and a peak in the vicinity of 4.9 ppm attributable to an urethane group formed was confirmed.

TABLE 1

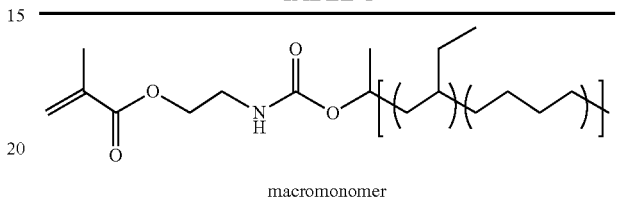

macromonomer (3) Preparation Example of Copolymer Base Oil Solution (3-1) Example 1

Into a reaction vessel equipped with a stirrer, a temperature sensor, a cooling pipe, a nitrogen inlet tube and a dropping funnel, 12 parts by mass of the macromonomer, 65 parts by mass of n-butyl methacrylate (BMA), 18 parts by mass of stearyl methacrylate (SMA) and 5 parts by mass of N-phenylmaleimide (PMI) were fed as monomer components and further 138.7 parts by mass of a base oil (YUBASE 4, manufactured by SK lubricants Co., Ltd.) and 0.05 parts by mass of pentaerythritol tetrakis(mercaptoacetate) were fed, and then the content was raised to 105° C. while introducing nitrogen gas thereto and stirring. A solution prepared by mixing 0.052 parts by mass of t-amylperoxyisononanoate (Luperox (registered trademark) 570, manufactured by Arkema Yoshitomi Ltd.) as a polymerization initiator and 5.1 parts by mass of a base oil (YUBASE 4, manufactured by SK lubricants Co., Ltd.) were added thereto, and solution polymerization was proceeded while dropping a solution prepared by dissolving 0.21 parts by mass of t-amylperoxyisononanoate (Luperox (registered trademark) 570, manufactured by Arkema Yoshitomi Ltd.) as a polymerization initiator in 13.7 parts by mass of a base oil (YUBASE 4, manufactured by SK lubricants Co., Ltd.) over 4 hours, and further aging was carried out for 2 hours. Subsequently, 140.0 parts by mass of a base oil (YUBASE 4, manufactured by SK lubricants Co., Ltd.) was added thereto to dilute, thereby obtaining a base oil solution of copolymer 1 (copolymer concentration: 25 mass %). The composition ratio of the units derived from the respective monomers in the obtained copolymer 1 and the analysis and evaluation results thereof are shown in Tables 2 and 4.

(3-2) Example 2

Into a reaction vessel equipped with a stirrer, a temperature sensor, a cooling pipe, a nitrogen inlet tube and a dropping funnel, 12 parts by mass of the macromonomer, 10 parts by mass of methyl methacrylate (MMA), 52 parts by mass of BMA, 21 parts by mass of SMA and 5 parts by mass of PMI were fed as monomer components and further 124.2 parts by mass of a base oil (YUBASE 4, manufactured by SK lubricants Co., Ltd.) and 0.05 parts by mass of pentaerythritol tetrakis(mercaptoacetate) were fed, and then the content was raised to 105° C. while introducing nitrogen gas thereto and stirring. A solution prepared by mixing 0.12 parts by mass of t-amylperoxyisononanoate (Luperox (registered trademark) 570, manufactured by Arkema Yoshitomi Ltd.) as a polymerization initiator and 8.2 parts by mass of a base oil (YUBASE 4, manufactured by SK lubricants Co., Ltd.) were added thereto, and solution polymerization was proceeded while dropping a solution prepared by dissolving 0.051 parts by mass of t-amylperoxy-2-ethylhexanoate (Luperox (registered trademark) 575, manufactured by Arkema Yoshitomi Ltd.) as a polymerization initiator in 3.4 parts by mass of a base oil (YUBASE 4, manufactured by SK lubricants Co., Ltd.) over 2 hours, and further aging was carried out for 4 hours. Subsequently, 97.3 parts by mass of a base oil (YUBASE 4, manufactured by SK lubricants Co., Ltd.) was added thereto to dilute, thereby obtaining a base oil solution of copolymer 2 (copolymer concentration: 30 mass %). The composition ratio of the units derived from the respective monomers in the obtained copolymer 2 and the analysis and evaluation results thereof are shown in Tables 2 and 4.

(3-3) Example 3

Into a reaction vessel equipped with a stirrer, a temperature sensor, a cooling pipe, a nitrogen inlet tube and a dropping funnel, 12 parts by mass of the macromonomer, 40 parts by mass of BMA, 12 parts by mass of SMA, 6 parts by mass of a mixture of lauryl methacrylate and tridecyl methacrylate (ratio by mass=54/46) (SLMA) and 3 parts by mass of PMI were fed as monomer components (initial) and further 130.4 parts by mass of a base oil (YUBASE 4, manufactured by SK lubricants Co., Ltd.) and 0.05 parts by mass of pentaerythritol tetrakis(mercaptoacetate) were fed, and then the content was raised to 105° C. while introducing nitrogen gas thereto and stirring. A solution prepared by mixing 0.052 parts by mass of t-amylperoxyisononanoate (Luperox (registered trademark) 570, manufactured by Arkema Yoshitomi Ltd.) as a polymerization initiator and 5.1 parts by mass of a base oil (YUBASE 4, manufactured by SK lubricants Co., Ltd.) were added thereto, and solution polymerization was proceeded while dropping a solution prepared by dissolving 0.21 parts by mass of t-amylperoxyisononanoate (Luperox (registered trademark) 570, manufactured by Arkema Yoshitomi Ltd.) as a polymerization initiator in 13.7 parts by mass of a base oil (YUBASE 4, manufactured by SK lubricants Co., Ltd.) and a mixture solution of 25 parts by mass of BMA and 2 parts by mass of PMI as dropping monomer components over 4 hours, and further aging was carried out for 4 hours. Subsequently, 149.0 parts by mass of a base oil (YUBASE 4, manufactured by SK lubricants Co., Ltd.) was added thereto to dilute, thereby obtaining a base oil solution of copolymer 3 (copolymer concentration: 25 mass %). The composition ratio of the units derived from the respective monomers in the obtained copolymer 3 and the analysis and evaluation results thereof are shown in Tables 2 and 4.

(3-4) Example 4

A base oil solution of copolymer 4 (polymer concentration: 25 mass %) was obtained in the same manner as in Example 3, except that 45 parts by mass of BMA was changed to 40 parts by mass of that, 12 parts by mass of SMA was changed to 0 parts by mass of that and 6 parts by mass of SLMA was changed to 23 parts by mass of that among the initially supplied monomer components, the amount of the base oil supplied before the polymerization reaction was changed from 130.4 parts by mass to 150.0 parts by mass, and the amount of the base oil added after aging was changed from 149.0 parts by mass to 130 parts by mass. The composition ratio of the units derived from the respective monomers in the obtained copolymer 4 and the analysis and evaluation results thereof are shown in Tables 2 and 4.

(3-5) Example 5

A base oil solution of copolymer 5 (polymer concentration: 30 mass %) was obtained in the same manner as in Example 2, except that 12 parts by mass of the macromonomer, 60 parts by mass of BMA, 23 parts by mass of SMA and 5 parts by mass of PMI were used as the monomer components, 0.12 parts by mass of t-amylperoxyisononanoate was changed to 0.0774 parts by mass of that, and 0.051 parts by mass of t-amylperoxy-2-ethylhexanoate was changed to 0.034 parts by mass of t-amylperoxyisononanoate (Luperox (registered trademark) 570, manufactured by Arkema Yoshitomi Ltd.). The composition ratio of the units derived from the respective monomers in the obtained copolymer 5 and the analysis and evaluation results thereof are shown in Tables 2 and 4.

(3-6) Example 6

A base oil solution of copolymer 6 (polymer concentration: 25 mass %) was obtained in the same manner as in Example 1, except that the amount of the base oil supplied before the polymerization reaction was changed from 138.7 parts by mass to 207.3 parts by mass, and the amount of the base oil added after aging was changed from 140.0 parts by mass to 74.0 parts by mass. The composition ratio of the units derived from the respective monomers in the obtained copolymer 6 and the analysis and evaluation results thereof are shown in Tables 2 and 4.

(3-7) Example 7

A base oil solution of copolymer 7 (polymer concentration: 25 mass %) was obtained in the same manner as in Example 3, except that 12 parts by mass of SMA was changed to 0 parts by mass of that and 6 parts by mass of SLMA was changed to 18 parts by mass of that among the initially supplied monomer components, the amount of the base oil supplied before the polymerization reaction was changed from 130.4 parts by mass to 150.0 parts by mass, the aging time after dropping was changed from 4 hours to 2 hours, and the amount of the base oil added after aging was changed from 149.0 parts by mass to 131.0 parts by mass. The composition ratio of the units derived from the respective monomers in the obtained copolymer 7 and the analysis and evaluation results thereof are shown in Tables 2 and 4.

(3-8) Example 8

Into a reaction vessel equipped with a stirrer, a temperature sensor, a cooling pipe, a nitrogen inlet tube and a dropping funnel, 14.6 parts by mass of hydrogenated polybutadiene containing hydroxyl group at one terminal thereof (Krasol HLBH-5000M, manufactured by TOTAL), 0.47 parts by mass of 2-isocyanatoethyl methacrylate (Karenz MOI, manufactured by Showa Denko KK), 92 parts by mass of a base oil (YUBASE 4, manufactured by SK lubricants Co., Ltd.) and 0.030 parts by mass of tetraoctyl titanate (Orgatics TA-30, manufactured by Matsumoto Fine Chemical Co., Ltd.) were fed, and the content was stirred for 30 minutes while heating at 75° C. with an oil bath and introducing nitrogen gas thereto, thereby obtaining 107.1 parts by mass of a base oil solution of the macromonomer shown in Table 1.

Subsequently, into a reaction vessel equipped with a stirrer, a temperature sensor, a cooling pipe, a nitrogen inlet tube and a dropping funnel, 107.1 parts by mass of the obtained base oil solution of the macromonomer, 60 parts by mass of BMA, 20 parts by mass of SLMA and 5 parts by mass of PMI were fed and further 117.7 parts by mass of a base oil (YUBASE 4, manufactured by SK lubricants Co., Ltd.) and 0.05 parts by mass of pentaerythritol tetrakis (mercaptoacetate) were fed, and then the content was raised to 105° C. while introducing nitrogen gas thereto and stirring. A solution prepared by mixing 0.0521 parts by mass of t-amylperoxyisononanoate (Luperox (registered trademark) 570, manufactured by Arkema Yoshitomi Ltd.) as a polymerization initiator and 5.1 parts by mass of a base oil (YUBASE 4, manufactured by SK lubricants Co., Ltd.) were added thereto, and solution polymerization was proceeded while dropping a solution prepared by dissolving 0.205 parts by mass of t-amylperoxyisononanoate (Luperox (registered trademark) 570, manufactured by Arkema Yoshitomi Ltd.) as a polymerization initiator in 13.7 parts by mass of a base oil (YUBASE 4, manufactured by SK lubricants Co., Ltd.) over 4 hours, and further aging was carried out for 2 hours. Subsequently, 30.8 parts by mass of a base oil (YUBASE 4, manufactured by SK lubricants Co., Ltd.) was added thereto to dilute, thereby obtaining a base oil solution of copolymer 8 (copolymer concentration: 28 mass %). The composition ratio of the units derived from the respective monomers in the obtained copolymer 8 and the analysis and evaluation results thereof are shown in Tables 2 and 4.

(3-9) Example 9

Into a reaction vessel equipped with a stirrer, a temperature sensor, a cooling pipe, a nitrogen inlet tube and a dropping funnel, 11.7 parts by mass of hydrogenated polybutadiene containing hydroxyl group at one terminal thereof (Krasol HLBH-5000M, manufactured by TOTAL), 0.38 parts by mass of 2-isocyanatoethyl methacrylate (Karenz MOI, manufactured by Showa Denko KK), 73.6 parts by mass of a base oil (YUBASE 4, manufactured by SK lubricants Co., Ltd.) and 0.024 parts by mass of tetraoctyl titanate (Orgatics TA-30, manufactured by Matsumoto Fine Chemical Co., Ltd.) were fed, and the content was stirred for 30 minutes while heating at 75° C. with an oil bath and introducing nitrogen gas thereto, thereby obtaining 85.7 parts by mass of a base oil solution of the macromonomer shown in Table 1.

Subsequently, into a reaction vessel equipped with a stirrer, a temperature sensor, a cooling pipe, a nitrogen inlet tube and a dropping funnel, 85.7 parts by mass of the obtained base oil solution of the macromonomer, 65 parts by mass of BMA, 18 parts by mass of SLMA and 5 parts by mass of N-cyclohexylmaleimide (CHMI) were fed and further 136.1 parts by mass of a base oil (YUBASE 4, manufactured by SK lubricants Co., Ltd.) and 0.05 parts by mass of pentaerythritol tetrakis(mercaptoacetate) were fed, and then the content was raised to 105° C. while introducing nitrogen gas thereto and stirring. A solution prepared by mixing 0.0521 parts by mass of t-amylperoxyisononanoate (Luperox (registered trademark) 570, manufactured by Arkema Yoshitomi Ltd.) as a polymerization initiator and 2.6 parts by mass of a base oil (YUBASE 4, manufactured by SK lubricants Co., Ltd.) were added thereto, and solution polymerization was proceeded while dropping a solution prepared by dissolving 0.205 parts by mass of t-amylperoxyisononanoate (Luperox (registered trademark) 570, manufactured by Arkema Yoshitomi Ltd.) as a polymerization initiator in 13.7 parts by mass of a base oil (YUBASE 4, manufactured by SK lubricants Co., Ltd.) over 4 hours, and further aging was carried out for 2 hours. Subsequently, 73.6 parts by mass of a base oil (YUBASE 4, manufactured by SK lubricants Co., Ltd.) was added thereto to dilute, thereby obtaining a base oil solution of copolymer 9 (copolymer concentration: 25 mass %). The composition ratio of the units derived from the respective monomers in the obtained copolymer 9 and the analysis and evaluation results thereof are shown in Tables 2 and 4.

(3-10) Example 10

A base oil solution of copolymer 10 (polymer concentration: 25 mass %) was obtained in the same manner as in Example 9, except that 5 parts by mass of CHMI was changed to 5 parts by mass of cyclohexyl methacrylate (CHMA), 65 parts by mass of BMA was changed to 55 parts by mass of that and 5 parts by mass of PMI was added, regarding the initially supplied monomer components. The composition ratio of the units derived from the respective monomers in the obtained copolymer 10 and the analysis and evaluation results thereof are shown in Tables 3 and 5.

(3-11) Example 11

A base oil solution of copolymer 11 (polymer concentration: 25 mass %) was obtained in the same manner as in Example 10, except that 5 parts by mass of CHMA was changed to 5 parts by mass of CHMI. The composition ratio of the units derived from the respective monomers in the obtained copolymer 11 and the analysis and evaluation results thereof are shown in Tables 3 and 5.

(3-12) Example 12

A base oil solution of copolymer 12 (polymer concentration: 28 mass %) was obtained in the same manner as in Example 9, except that 65 parts by mass of BMA was changed to 67 parts by mass of that, 18 parts by mass of SLMA was changed to 13 parts by mass of SMA and 5 parts by mass of CHMI was changed to 8 parts by mass of that among the initially supplied monomer components, and the amount of the base oil added after aging was changed from 73.6 parts by mass to 49.1 parts by mass. The composition ratio of the units derived from the respective monomers in the obtained copolymer 12 and the analysis and evaluation results thereof are shown in Tables 3 and 5.

(3-13) Comparative Example 1

A base oil solution of copolymer 13 (polymer concentration: 25 mass %) was obtained in the same manner as in Example 1, except that 65 parts by mass of BMA was changed to 70 parts by mass of that and 5 parts by mass of PMI was changed to 0 parts by mass of that, as the monomer components. The composition ratio of the units derived from the respective monomers in the obtained copolymer 13 and the analysis and evaluation results thereof are shown in Tables 3 and 5.

(3-14) Comparative Example 2

A base oil solution of copolymer 14 (polymer concentration: 30 mass %) was obtained in the same manner as in Example 2, except that 12 parts by mass of the macromonomer, 71 parts by mass of BMA, 5 parts by mass of lauryl methacrylate (LMA) and 12 parts by mass of styrene were used as the monomer components. The composition ratio of the units derived from the respective monomers in the obtained copolymer 14 and the analysis and evaluation results thereof are shown in Tables 3 and 5.

(3-15) Comparative Example 3

A base oil solution of copolymer 15 (polymer concentration: 30 mass %) was obtained in the same manner as in Example 2, except that 10 parts by mass of the macromonomer, 40 parts by mass of MMA, 20 parts by mass of SMA and 30 parts by mass of decyltetradecyl methacrylate (DTDMA) were used as the monomer components. The composition ratio of the units derived from the respective monomers in the obtained copolymer 15 and the analysis and evaluation results thereof are shown in Tables 3 and 5.

(3-16) Comparative Example 4

A base oil solution of copolymer 16 (polymer concentration: 30 mass %) was obtained in the same manner as in Example 2, except that 71 parts by mass of BMA and 29 parts by mass of SLMA were used as the monomer components. The composition ratio of the units derived from the respective monomers in the obtained copolymer 16 and the analysis and evaluation results thereof are shown in Tables 3 and 5.

(3-17) Comparative Example 5

Into a reaction vessel equipped with a stirrer, a temperature sensor, a cooling pipe, a nitrogen inlet tube and a dropping funnel, 30 parts by mass of MMA, 30 parts by mass of SMA, 40 parts by mass of SLMA, 53.33 parts by mass of toluene and 0.05 parts by mass of pentaerythritol tetrakis(mercaptoacetate) were fed, and then the content was raised to 105° C. while introducing nitrogen gas thereto. A solution prepared by mixing 0.0258 parts by mass of t-amylperoxyisononanoate (Luperox (registered trademark) 570, manufactured by Arkema Yoshitomi Ltd.) as a polymerization initiator and 0.46 parts by mass of toluene were added thereto, and solution polymerization was proceeded while dropping a solution prepared by dissolving 0.103 parts by mass of the polymerization initiator in 10.3 parts by mass of toluene over 4 hours, and further aging was carried out for 4 hours. Subsequently, the cooling pipe was replaced by a distilling head connected to a cooling pipe and a distillate receiver, and 233 parts by mass of a base oil (YUBASE 4, manufactured by SK lubricants Co., Ltd.) was added into the reaction vessel. After raising a bath temperature of the reaction vessel to 150° C., the pressure was gradually reduced using a vacuum pump to remove toluene. After 30 minutes from the internal temperature of the reaction vessel reached 142° C., pressure reduction was released and cooled to obtain a base oil solution of copolymer 17 (polymer concentration: 30 mass %). The composition ratio of the units derived from the respective monomers in the obtained copolymer 17 and the analysis and evaluation results thereof are shown in Tables 3 and 5.

TABLE 2

| | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Composition of respective monomer-derived units | PMI | mass % | 6 | 6 | 6 | 6 | 6 | 6 | 5 | 5 | |
| | CHMI | mass % | | | | | | | | | 5 |
| | macromonomer | mass % | 12 | 11 | 11 | 11 | 12 | 11 | 11 | 15 | 11 |
| | MMA | mass % | | 11 | | | | | | | |
| | BMA | mass % | 65 | 52 | 66 | 61 | 60 | 66 | 66 | 60 | 66 |
| | CHMA | mass % | | | | | | | | | |
| | SMA | mass % | 17 | 20 | 11 | | 22 | 17 | | | |
| | SLMA | mass % | | | 6 | 22 | | | 18 | 20 | 18 |
| | LMA | mass % | | | | | | | | | |
| | DTDMA | mass % | | | | | | | | | |
| | styrene | mass % | | | | | | | | | |
| Polymerization ratio | PMI | mass % | 99.9 | 99.7 | 99.6 | 99.6 | 99.7 | 99.5 | 98.8 | 99.7 | — |
| | CHMI | mass % | — | — | — | — | — | — | — | — | 97.2 |
| | macromonomer | mass % | 88.3 | 88.2 | 83.4 | 83.6 | 84.8 | 84.3 | 82.6 | 82.1 | 84.7 |
| | BMA | mass % | 91.8 | 94.3 | 92.4 | 94.0 | 93.2 | 91.3 | 95.0 | 91.9 | 92.7 |
| Macromonomer content | | mass % | 11.7 | 11.8 | 16.6 | 16.4 | 15.2 | 15.7 | 17.4 | 17.9 | 15.3 |
| Molecular weight | Mw | $10^4$ | 54.5 | 41.6 | 43.3 | 37.0 | 41.0 | 40.9 | 44.4 | 38.9 | 36.1 |
| | Mn | $10^4$ | 19.6 | 17.6 | 17.0 | 14.9 | 17.5 | 16.5 | 15.2 | 14.5 | 14.0 |
| | Mw/Mn | — | | 2.8 | 2.4 | 2.6 | 2.5 | 2.3 | 2.5 | 2.9 | 2.7 | 2.6 |

TABLE 3

| | | | Ex. 10 | Ex. 11 | Ex. 12 | Comp. Ex. 1 | Comp. Ex. 2 | Comp. Ex. 3 | Comp. Ex. 4 | Comp. Ex. 5 |
|---|---|---|---|---|---|---|---|---|---|---|
| Composition of respective monomer-derived units | PMI | mass % | 5 | 5 | | | | | | |
| | CHMI | mass % | | 5 | 8 | | | | | |
| | macromonomer | mass % | 11 | 11 | 11 | 11 | 12 | 10 | | |
| | MMA | mass % | | | | | | | 41 | 31 |

TABLE 3-continued

|  |  |  | Ex. 10 | Ex. 11 | Ex. 12 | Comp. Ex. 1 | Comp. Ex. 2 | Comp. Ex. 3 | Comp. Ex. 4 | Comp. Ex. 5 |
|---|---|---|---|---|---|---|---|---|---|---|
|  | BMA | mass % | 56 | 56 | 68 | 71 | 71 |  | 71 |  |
|  | CHMA | mass % | 5 |  |  |  |  |  |  |  |
|  | SMA | mass % |  |  | 13 | 18 |  | 20 |  | 29 |
|  | SLMA | mass % | 23 | 23 |  |  |  |  | 29 | 40 |
|  | LMA | mass % |  |  |  |  | 5 |  |  |  |
|  | DTDMA | mass % |  |  |  |  |  | 29 |  |  |
|  | styrene | mass % |  |  |  |  | 12 |  |  |  |
| Polymerization | PMI | mass % | 99.7 | 99.7 | — | — | Deposition | — | Deposition | — |
| ratio | CHMI | mass % | — | 98.3 | 97.9 |  | during |  | during |  |
|  | macromonomer | mass % | 82.2 | 82.8 | 82.4 | 81.0 | polymerization | 80.7 | polymerization | — |
|  | BMA | mass % | 92.6 | 94.2 | 94.0 | 89.1 |  | — |  | — |
| Macromonomer content |  | mass % | 17.8 | 17.2 | 17.6 | 19.0 | — | 19.3 | — | — |
| Molecular | Mw | $10^4$ | 37.8 | 35.2 | 36.5 | 42.8 | 30.8 | 49.4 | 40.0 | 33.5 |
| weight | Mn | $10^4$ | 14.7 | 13.6 | 14.4 | 13.4 | 14.1 | 21.3 | 16.8 | 11.8 |
|  | Mw/Mn | — | — | 2.6 | 2.6 | 2.5 | 3.2 | 2.2 | 2.3 | 2.4 | 2.8 |

TABLE 4

|  |  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Properties of base oil solution of copolymer | Base oil solubility | — | A | A | A | A | A | A | A | A | A |
|  | Viscosity (I) | mPa·s | 620 | 320 | 420 | 640 | 7900 | 330 | 200 | 270 | 3220 |
|  |  | — | A | A | A | A | A | A | A | A | A |
|  | Viscosity (II) | Pa·s | 0.3 | 5.1 | 0.3 | 0.3 | 0.6 | 0.2 | 0.5 | 0.3 | 0.7 |
|  |  | — | A | A | A | A | A | A | A | A | A |
|  | Viscosity index | — | 282 | 264 | 282 | 286 | 276 | 278 | 276 | 278 | 297 |
|  | Shear stability (SSI) | — | 24 | 16 | 25 | 16 | 25 | 18 | 25 | 13 | 22 |
|  |  | — | A | A | A | A | A | A | A | A | A |
|  | Polymer concentration in measurement | mass % | 3.86 | 4.97 | 3.44 | 4.25 | 3.56 | 4.17 | 4.67 | 4.54 | 3.50 |
| Intrinsic viscosity | $[\eta]_{40}$ | dL/g | 0.054 | 0.050 | 0.057 | 0.019 | 0.063 | 0.049 | 0.035 | 0.055 | 0.049 |
|  | $[\eta]_{60}$ | dL/g | 0.068 | 0.063 | 0.072 | 0.064 | 0.079 | 0.070 | 0.060 | 0.059 | 0.069 |
|  | $[\eta]_{80}$ | dL/g | 0.087 | 0.072 | 0.093 | 0.081 | 0.103 | 0.076 | 0.078 | 0.071 | 0.093 |
|  | $[\eta]_{100}$ | dL/g | 0.123 | 0.088 | 0.130 | 0.109 | 0.148 | 0.112 | 0.098 | 0.101 | 0.146 |
|  | $[\eta]_{100}/[\eta]_{40}$ | — | 2.28 | 1.75 | 2.28 | 5.90 | 2.35 | 2.29 | 2.78 | 1.86 | 2.98 |

TABLE 5

|  |  |  | Ex. 10 | Ex. 11 | Ex. 12 | Comp. Ex. 1 | Comp. Ex. 2 | Comp. Ex. 3 | Comp. Ex. 4 | Comp. Ex. 5 |
|---|---|---|---|---|---|---|---|---|---|---|
| Properties of base oil solution of copolymer | Base oil solubility | — | A | A | A | B | C | A | C | A |
|  | Viscosity (I) | mPa·s | 690 | 900 | 2570 | 8700 | — | >20000 | — | >20000 |
|  |  | — | A | A | A | C | — | C | — | C |
|  | Viscosity (II) | Pa·s | 0.3 | 0.3 | 0.5 | — | — | — | — | — |
|  |  | — | A | A | A |  |  |  |  |  |
|  | Viscosity index | — | 284 | 277 | 289 | 296 | — | 240 | — | 217 |
|  | Shear stability (SSI) | — | 16 | 13 | 24 | 34 | — | 42 | — | 40 |
|  |  | — | A | A | A | A | — | C | — | C |
|  | Polymer concentration in measurement | mass % | 4.10 | 4.39 | 3.54 | 2.86 | — | 2.98 | — | 3.00 |
| Intrinsic viscosity | $[\eta]_{40}$ | dL/g | 0.052 | 0.046 | 0.056 | 0.055 | — | 0.167 | — | 0.128 |
|  | $[\eta]_{60}$ | dL/g | 0.066 | 0.060 | 0.072 | 0.079 | — | 0.191 | — | 0.121 |
|  | $[\eta]_{80}$ | dL/g | 0.079 | 0.072 | 0.094 | 0.123 | — | 0.226 | — | 0.154 |
|  | $[\eta]_{100}$ | dL/g | 0.103 | 0.108 | 0.147 | 0.210 | — | 0.281 | — | 0.206 |
|  | $[\eta]_{100}/[\eta]_{40}$ | — | 1.97 | 2.38 | 2.63 | 3.85 | — | 1.69 | — | 1.61 |

(4) Results

Tables 2 to 5 show the composition ratio (mass basis) of the units derived from the respective monomers, the polymerization ratio, molecular weight and the evaluation results of properties of the copolymers prepared in Examples and Comparative Examples. In Tables 2 and 3, the polymerization ratio means the polymerization ratio of each monomer at the completion of polymerization. The macromonomer content means the content of the macromonomer relative to 100 parts by mass of the total amount of the macromonomer-derived unit (b) and the macromonomer in the base oil solution of the copolymer. The "polymer concentration in measurement" in the properties of the base oil solution of the copolymer means the concentration of the copolymer in the base oil solution prepared by diluting the copolymer with a base oil (YUBASE 4, manufactured by SK lubricants Co., Ltd.) so that the kinematic viscosity at 100° C. is 7.0 mm²/s in measuring the shear stability.

Since the copolymers used in the Comparative Examples 1 and 3 had the unit (b) but did not have the unit (a) derived from a maleimide monomer, the polymerization ratio was low, solubility in the base oil was poor and viscosity of the base oil solution at room temperature increased. In Comparative Example 2 in which a unit derived from styrene was introduced in place of the unit (a) derived from a maleimide monomer, base oil solubility was poor and precipitation occurred during polymerization. In Comparative Example 4 in which the unit (b) was not contained, base oil solubility was poor and precipitation occurred during polymerization. In contrast to those, the copolymers used in Examples 1 to 12 had the unit (a) derived from a maleimide monomer in addition to the unit (b), so that they were excellent in base oil solubility, viscosity of the base oil solution thereof at room temperature was low, and the handling property was excellent.

INDUSTRIAL APPLICABILITY

The viscosity index improver of the present invention can be used as a lubricating oil composition, that is suitably used for a driving lubricating oil, a hydraulic oil and an engine oil and the like.

The invention claimed is:

1. A viscosity index improver comprising a copolymer having a unit (a) derived from a maleimide monomer and a unit (b) derived from a macromonomer, wherein
the unit (b) is represented by the following formula (2):

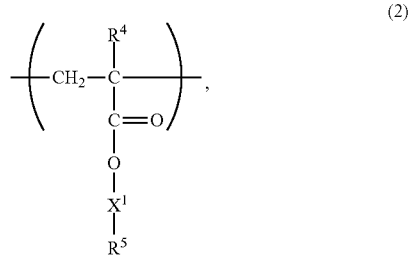

wherein $R^4$ represents a hydrogen atom or an alkyl group having 1 to 4 carbon atoms, $X^1$ represents a single bond, an alkylene group, —O—, —CO—, —NH— or a linking group formed by combinations thereof, and $R^5$ represents a hydrocarbon group having 70 or more carbon atoms containing a repeating structure of a branched chain alkylene group; and
viscosity measured by the following method is 8000 mPa·s or less:
Viscosity measurement method: a solution composed of 78 mass % of a Group III base oil (viscosity index: 122, kinematic viscosity at 40° C.: 19.6 mm²/s) on the American Petroleum Institute (API) classification and 22 mass % of the copolymer is measured with a viscometer (TVB-10 manufactured by Toki Sangyo Co., Ltd., rotor: SPINDLE No. M3, rotation speed: 6 rpm) at 25° C.

2. The viscosity index improver according to claim 1, wherein a content of the unit (a) is 1 part by mass or more and 20 parts by mass or less in 100 parts by mass of the copolymer.

3. The viscosity index improver according to claim 1, wherein a content of the macromonomer is 18 parts by mass or less, relative to 100 parts by mass of a total of the unit (b) and the macromonomer.

4. The viscosity index improver according to claim 1, wherein weight-average molecular weight (Mw) of the copolymer is 200,000 to 700,000, and number-average molecular weight (Mn) of the copolymer is 120,000 to 500,000.

5. The viscosity index improver according to claim 1, wherein
the copolymer further has a unit (c) derived from an alkyl (meth)acrylate having an alkyl group of 1 to 6 carbon atoms, and
a content of the unit (b) is 6 parts by mass or more and less than 20 parts by mass, a content of the unit (c) is 40 parts by mass or more and less than 74 parts by mass, and a total content of the unit (b) and the unit (c) is 46 parts by mass or more and less than 80 parts by mass in 100 parts by mass of the copolymer.

6. The viscosity index improver according to claim 1, wherein
the copolymer further has a unit (d) derived from an alkyl (meth)acrylate having an alkyl group of 11 to 40 carbon atoms, and
a content of the unit (d) is 3 parts by mass or more and 40 parts by mass or less in 100 parts by mass of the copolymer.

7. The viscosity index improver according to claim 1, wherein the unit (b) has an urethane bond.

8. The viscosity index improver according to claim 1, wherein
an intrinsic viscosity $[\eta]_{100}$ of the copolymer in a Group III base oil (viscosity index: 122, kinematic viscosity at 40° C.: 19.6 mm²/s) on the American Petroleum Institute (API) classification at 100° C. is 0.07 dL/g or more and 0.17 dL/g or less, and an intrinsic viscosity $[\eta]_{40}$ of that at 40° C. is 0.01 dL/g or more and 0.08 dL/g or less.

9. A lubricating oil composition comprising a lubricating base oil and the viscosity index improver according to claim 1.

10. The viscosity index improver according to claim 1, wherein the unit (a) is represented by the following formula (1):

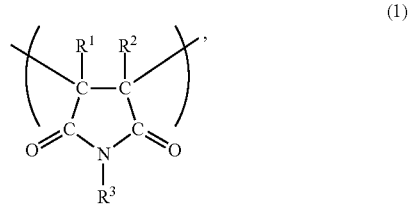

wherein $R^1$ and $R^2$ each independently represent a hydrogen atom or an alkyl group, and $R^3$ represents a hydrogen atom or an organic group having 1 to 40 carbon atoms.

11. The viscosity index improver according to claim 1, wherein the copolymer further has a branch unit derived from a tri- or higher functional chain transfer agent and/or a tri- or higher functional polymerization initiator.

* * * * *